(12) United States Patent
Guan

(10) Patent No.: US 11,064,490 B2
(45) Date of Patent: Jul. 13, 2021

(54) METHOD AND DEVICE FOR TRANSMITTING AND RECEIVING INFORMATION

(71) Applicant: Huawei Technologies Co., Ltd., Guangdong (CN)

(72) Inventor: Lei Guan, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 38 days.

(21) Appl. No.: 16/562,217

(22) Filed: Sep. 5, 2019

(65) Prior Publication Data

US 2019/0394779 A1  Dec. 26, 2019

Related U.S. Application Data

(63) Continuation of application No. PCT/CN2018/079994, filed on Mar. 22, 2018.

(30) Foreign Application Priority Data

Mar. 23, 2017 (CN) .......................... 201710179820.5

(51) Int. Cl.
*H04W 72/04* (2009.01)
*H04W 74/00* (2009.01)
*H04W 74/08* (2009.01)

(52) U.S. Cl.
CPC ..... *H04W 72/0453* (2013.01); *H04W 74/006* (2013.01); *H04W 74/0833* (2013.01)

(58) Field of Classification Search
CPC ......... H04W 74/0833; H04W 72/0453; H04W 72/042; H04W 74/006; H04W 74/002;
(Continued)

(56) References Cited

U.S. PATENT DOCUMENTS 9,585,164 B2 *  2/2017  Fong ................. H04W 74/0833
9,730,250 B2 *  8/2017  You ..................... H04W 74/002
(Continued)

FOREIGN PATENT DOCUMENTS

CN  103687037 A  3/2014
CN  104025684 A  9/2014
(Continued)

OTHER PUBLICATIONS

3GPP TSG RAN WG1 NR Ad-Hoc Meeting, R1-1700032: "Considerations of NR UL operation on the uplink band of LTE", Huawei, HiSilicon, Spokane, USA, Jan. 16-20, 2017, total 6 pages.

*Primary Examiner* — Wutchung Chu
(74) *Attorney, Agent, or Firm* — Womble Bond Dickinson (US) LLP

(57) ABSTRACT

Embodiments of this application provide a method and a device for transmitting and receiving information. The method includes: receiving, by a terminal device on a first downlink carrier, a broadcast message transmitted by a network device, where the broadcast message includes second downlink configuration information corresponding to a second downlink carrier, the second downlink configuration information includes second downlink frequency information and/or physical cell identifier information of the second downlink carrier, the first downlink carrier and a second uplink carrier are serving carriers of the terminal device, the second downlink carrier is not a serving carrier of the terminal device, and the second downlink carrier and the second uplink carrier are paired carriers on a system level. Signal transmission on an LTE low-frequency uplink carrier based on LTE low-frequency downlink carrier configuration information carried on an NR high-frequency downlink carrier helps improve system performance in an NR-LTE coexistence scenario.

12 Claims, 13 Drawing Sheets

(58) Field of Classification Search
CPC .... H04W 76/15; H04W 74/08; H04L 5/0048; H04L 5/0094
See application file for complete search history.

(56) References Cited

U.S. PATENT DOCUMENTS

| | | | |
|---|---|---|---|
| 10,531,409 B2* | 1/2020 | Zhang | H04W 72/02 |
| 2010/0296467 A1* | 11/2010 | Pelletier | H04W 72/042 370/329 |
| 2016/0150571 A1* | 5/2016 | Pelletier | H04W 74/0833 370/329 |
| 2016/0234713 A1 | 8/2016 | Lin et al. | |
| 2017/0230928 A1* | 8/2017 | Basu Mallick | H04W 56/0045 |
| 2017/0273032 A1 | 9/2017 | Qin et al. | |
| 2017/0310385 A1 | 10/2017 | Hwang et al. | |
| 2017/0331577 A1* | 11/2017 | Parkvall | H04W 8/18 |
| 2018/0013479 A1 | 1/2018 | Guan et al. | |
| 2018/0070369 A1* | 3/2018 | Papasakellariou | H04W 16/14 |
| 2018/0092129 A1* | 3/2018 | Guo | H04W 56/001 |
| 2018/0167979 A1* | 6/2018 | Guo | H04W 16/28 |
| 2018/0227848 A1* | 8/2018 | Lee | H04L 5/0091 |
| 2018/0242365 A1* | 8/2018 | Rathonyi | H04W 74/008 |
| 2018/0255553 A1* | 9/2018 | Gaal | H04W 72/0453 |
| 2018/0270682 A1* | 9/2018 | Zacharias | H04W 74/0833 |
| 2019/0104456 A1* | 4/2019 | Kubota | H04W 36/165 |
| 2019/0223212 A1* | 7/2019 | Xiao | H04W 74/008 |
| 2019/0320430 A1* | 10/2019 | Kim | H04L 27/2613 |
| 2019/0349889 A1* | 11/2019 | Lu | H04W 72/005 |
| 2019/0357264 A1* | 11/2019 | Yl | H04L 5/001 |

FOREIGN PATENT DOCUMENTS

| | | |
|---|---|---|
| CN | 104683082 A | 6/2015 |
| CN | 104770033 A | 7/2015 |
| CN | 106231637 A | 12/2016 |
| WO | 2015046979 A1 | 4/2015 |
| WO | 2016072700 A2 | 5/2016 |
| WO | 2016149887 A1 | 9/2016 |

\* cited by examiner

A terminal device receives, on a first downlink carrier, a broadcast message transmitted by a network device, where the broadcast message includes second downlink configuration information corresponding to a second downlink carrier, the second downlink configuration information includes second downlink frequency information and/or physical cell identifier information of the second downlink carrier, the first downlink carrier and a second uplink carrier are serving carriers of the terminal device, the second downlink carrier is not a serving carrier of the terminal device, and the second downlink carrier and the second uplink carrier are paired carriers on a system level ⎯ S101

FIG. 3

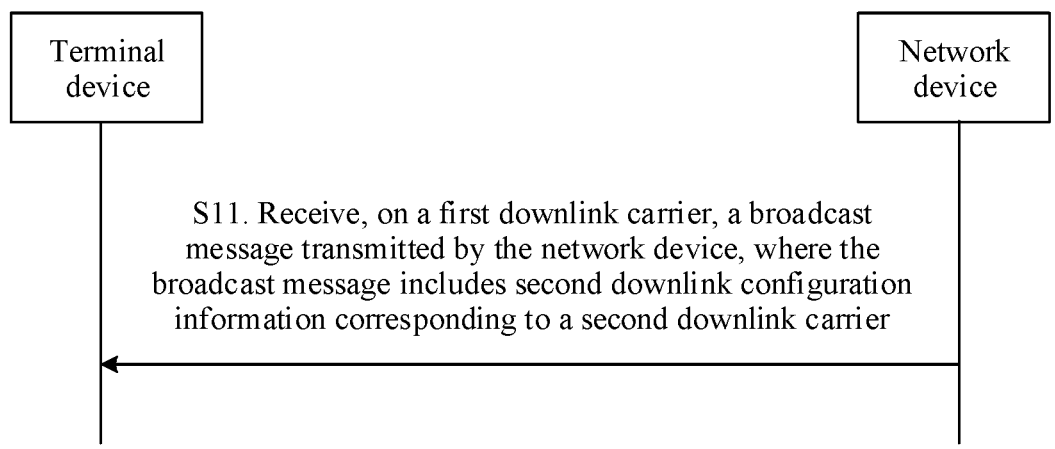

FIG. 4

METHOD AND DEVICE FOR TRANSMITTING AND RECEIVING INFORMATION

CROSS-REFERENCE TO RELATED APPLICATIONS

This application is a continuation of International Application No. PCT/CN2018/079994, filed on Mar. 22, 2018, which claims priority to Chinese Patent Application No. 201710179820.5, filed on Mar. 23, 2017. The disclosures of the aforementioned applications are incorporated herein by reference in their entireties.

TECHNICAL FIELD

This application relates to communications technologies, and in particular, to a method and a device for transmitting and receiving information.

BACKGROUND

With continuous development of communications technologies, research and standardization on a $5^{th}$ Generation (5G) mobile communications technology have begun. In consideration of 5G compatibility, 5G compatibility includes two points. One point is continuous evolution compatible with long term evolution (LTE), 4G, and the other point is a new radio (NR) system incompatible with LTE. The NR system is generally deployed at a high frequency, for example, 3.5 GHz, or even 28 GHz. Therefore, a network device may transmit a downlink signal on an NR high-frequency downlink carrier, and the network device needs to use a massive antenna array to implement beamforming with a high gain and enhance downlink signal coverage. Then a terminal device within a management scope of the network device can receive the downlink signal. However, due to a size limit, the terminal device is generally unlikely to use excessive antennas to implement beamforming. Therefore, when the terminal device transmits an uplink signal on an NR high-frequency uplink carrier to the network device, signal coverage of the uplink signal is relatively narrow. Consequently, a problem that uplink coverage and downlink coverage in the system are inconsistent is caused, and finally only the uplink coverage prevails during system deployment, that is, the uplink coverage is a bottleneck of the system.

Currently, the problem that the uplink coverage of the NR system is limited is resolved in a manner of NR-LTE coexistence in a standard. FIG. 1 is a diagram of a deployment scenario in which NR and LTE coexist in the prior art. As shown in FIG. 1, a terminal device receives, on an NR high-frequency downlink carrier, a downlink signal transmitted by a network device, and the terminal device transmits an uplink signal on an LTE low-frequency uplink carrier to the network device, thereby resolving a problem that signal quality of the uplink signal transmitted by the terminal device is relatively poor.

However, in the prior art, when the terminal device receives, on the NR high-frequency downlink carrier, the downlink signal transmitted by the network device, the terminal device measures a reference signal of the NR high-frequency downlink carrier or the like based on configuration information corresponding to the NR high-frequency downlink carrier, to obtain downlink reference information, where the reference information includes, for example, a downlink path loss, a downlink receive timing, downlink time synchronization information, or downlink frequency synchronization information. Therefore, the obtained downlink reference information may be used to determine a reference parameter when the terminal device transmits the uplink signal on the LTE low-frequency uplink carrier to the network device. The reference parameter includes, for example, uplink transmit power or an uplink transmit timing. However, there is a great frequency difference between LTE and NR. Therefore, when the configuration information corresponding to the NR high-frequency downlink carrier is used to obtain the downlink reference information for transmitting the signal on the LTE low-frequency uplink carrier, the downlink reference information cannot accurately represent a feature of the signal on the uplink carrier, and further, system performance in the NR-LTE coexistence scenario is degraded.

SUMMARY

This application provides a method and a device for transmitting and receiving information, to resolve a problem that system performance is degraded in the NR-LTE coexistence scenario because downlink reference information cannot accurately represent a feature of a signal on an uplink carrier in the prior art.

According to a first aspect, this application provides a method for transmitting and receiving information, where the method includes: receiving, by a terminal device on a first downlink carrier, a broadcast message transmitted by a network device, where the broadcast message includes second downlink configuration information corresponding to a second downlink carrier, where the second downlink configuration information includes second downlink frequency information and/or physical cell identifier information of the second downlink carrier, the first downlink carrier and a second uplink carrier are serving carriers of the terminal device, the second downlink carrier is not a serving carrier of the terminal device, and the second downlink carrier and the second uplink carrier are paired carriers on a system level.

In one embodiment, the first downlink carrier is located on a first band, the second uplink carrier and the second downlink carrier are located on a second band, and a frequency of the first band is higher than a frequency of the second band.

In one embodiment, after the receiving, by a terminal device on a first downlink carrier, a broadcast message transmitted by a network device, the method further includes:

determining, by the terminal device, reference information of the second downlink carrier based on the second downlink configuration information.

In one embodiment, the reference information includes at least one of the following:

a reference path loss, a reference downlink receive timing, reference time synchronization information, and reference frequency synchronization information.

In one embodiment, after the determining reference information of the second downlink carrier, the method further includes:

transmitting, by the terminal device, an uplink signal on the second uplink carrier to the network device based on the reference information of the second downlink carrier.

In one embodiment, after the receiving, by a terminal device on a first downlink carrier, a broadcast message transmitted by a network device, the method further includes:

performing, by the terminal device, radio resource management (RRM) measurement on the second downlink carrier based on the second downlink configuration information to obtain a measurement result; and performing, by the terminal device, mobility management on the second uplink carrier based on the measurement result.

In one embodiment, the broadcast message further includes random access configuration information of the second uplink carrier; and after the receiving, by a terminal device on a first downlink carrier, a broadcast message transmitted by a network device, the method further includes:

performing, by the terminal device, random access on the second uplink carrier based on the random access configuration information.

In one embodiment, the broadcast message further includes second uplink configuration information corresponding to the second uplink carrier; and the second uplink configuration information includes second uplink frequency information of the second uplink carrier.

In one embodiment, the broadcast message further includes first uplink configuration information corresponding to a first uplink carrier; and the first uplink configuration information includes first uplink frequency information of the first uplink carrier.

In one embodiment, after the receiving, by a terminal device on a first downlink carrier, a broadcast message transmitted by a network device, the method further includes:

transmitting, by the terminal device, an uplink signal on the first uplink carrier to the network device based on the first uplink configuration information.

In one embodiment, the first uplink carrier is a serving carrier of the terminal device.

According to a second aspect, this application provides a method for transmitting and receiving information, where the method includes: transmitting, by a network device, a broadcast message on a first downlink carrier, where the broadcast message includes second downlink configuration information corresponding to a second downlink carrier, where the second downlink configuration information includes second downlink frequency information and/or physical cell identifier information of the second downlink carrier, the first downlink carrier and a second uplink carrier are serving carriers of a terminal device, the second downlink carrier is not a serving carrier of the terminal device, and the second downlink carrier and the second uplink carrier are paired carriers on a system level.

In one embodiment, the first downlink carrier is located on a first band, the second uplink carrier and the second downlink carrier are located on a second band, and a frequency of the first band is higher than a frequency of the second band.

In one embodiment, after the transmitting, by a network device, a broadcast message on a first downlink carrier, the method further includes:

receiving, by the network device, an uplink signal transmitted by the terminal device on the second uplink carrier based on reference information of the second downlink carrier, where the reference information of the second downlink carrier is determined by the terminal device based on the second downlink configuration information.

In a possible design, the reference information includes at least one of the following:

a reference path loss, a reference downlink receive timing, reference time synchronization information, and reference frequency synchronization information.

In one embodiment, the broadcast message further includes random access configuration information of the second uplink carrier; and after the transmitting, by a network device, a broadcast message on a first downlink carrier, the method further includes:

receiving, by the network device, a random access request transmitted by the terminal device on the second uplink carrier based on the random access configuration information, for random access of the terminal device.

In one embodiment, the broadcast message further includes second uplink configuration information corresponding to the second uplink carrier; and the second uplink configuration information includes second uplink frequency information of the second uplink carrier.

In one embodiment, the broadcast message further includes first uplink configuration information corresponding to a first uplink carrier; and the first uplink configuration information includes first uplink frequency information of the first uplink carrier.

In one embodiment, after the transmitting, by a network device, a broadcast message on a first downlink carrier, the method further includes:

receiving, by the network device, an uplink signal transmitted by the terminal device on the first uplink carrier based on the first uplink configuration information.

In one embodiment, the first uplink carrier is a serving carrier of the terminal device.

According to a third aspect, this application provides a terminal device, including:

a first receiving module configured to receive, on a first downlink carrier, a broadcast message transmitted by a network device, where the broadcast message includes second downlink configuration information corresponding to a second downlink carrier, where the second downlink configuration information includes second downlink frequency information and/or physical cell identifier information of the second downlink carrier, the first downlink carrier and a second uplink carrier are serving carriers of the terminal device, the second downlink carrier is not a serving carrier of the terminal device, and the second downlink carrier and the second uplink carrier are paired carriers on a system level.

In one embodiment, the first downlink carrier is located on a first band, the second uplink carrier and the second downlink carrier are located on a second band, and a frequency of the first band is higher than a frequency of the second band.

In one embodiment, the terminal device further includes:

a calculation module, configured to determine reference information of the second downlink carrier based on the second downlink configuration information after the first receiving module receives, on the first downlink carrier, the broadcast message transmitted by the network device.

In one embodiment, the reference information includes at least one of the following:

a reference path loss, a reference downlink receive timing, reference time synchronization information, and reference frequency synchronization information.

In one embodiment, the terminal device further includes:

a first transmission module, configured to transmit an uplink signal on the second uplink carrier to the network device based on the reference information of the second downlink carrier after the calculation module determines the reference information of the second downlink carrier.

In one embodiment, the terminal device further includes:

a processing module, configured to: after the first receiving module receives, on the first downlink carrier, the broadcast message transmitted by the network device, perform RRM measurement on the second downlink carrier based on the second downlink configuration information to obtain a measurement result; and perform mobility management on the second uplink carrier based on the measurement result.

In one embodiment, the broadcast message further includes random access configuration information of the second uplink carrier; and the terminal device further includes:

an access module configured to perform random access on the second uplink carrier based on the random access configuration information after the first receiving module receives, on the first downlink carrier, the broadcast message transmitted by the network device.

In one embodiment, the broadcast message further includes second uplink configuration information corresponding to the second uplink carrier; and the second uplink configuration information includes second uplink frequency information of the second uplink carrier.

In one embodiment, the broadcast message further includes first uplink configuration information corresponding to a first uplink carrier; and the first uplink configuration information includes first uplink frequency information of the first uplink carrier.

In one embodiment, the terminal device further includes:

a second transmission module, configured to transmit an uplink signal on the first uplink carrier to the network device based on the first uplink configuration information after the first receiving module receives, on the first downlink carrier, the broadcast message transmitted by the network device.

In one embodiment, the first uplink carrier is a serving carrier of the terminal device.

According to a fourth aspect, this application provides a network device, including: a third transmission module configured to transmit a broadcast message on a first downlink carrier, where the broadcast message includes second downlink configuration information corresponding to a second downlink carrier, where the second downlink configuration information includes second downlink frequency information and/or physical cell identifier information of the second downlink carrier, the first downlink carrier and a second uplink carrier are serving carriers of a terminal device, the second downlink carrier is not a serving carrier of the terminal device, and the second downlink carrier and the second uplink carrier are paired carriers on a system level.

In one embodiment, the first downlink carrier is located on a first band, the second uplink carrier and the second downlink carrier are located on a second band, and a frequency of the first band is higher than a frequency of the second band.

In one embodiment, the network device further includes:

a second receiving module configured to: after the third transmission module transmits the broadcast message on the first downlink carrier, receive an uplink signal transmitted by the terminal device on the second uplink carrier based on reference information of the second downlink carrier, where the reference information of the second downlink carrier is determined by the terminal device based on the second downlink configuration information.

In one embodiment, the reference information includes at least one of the following:

a reference path loss, a reference downlink receive timing, reference time synchronization information, and reference frequency synchronization information.

In one embodiment, the broadcast message further includes random access configuration information of the second uplink carrier; and the network device further includes:

an access processing module configured to: after the third transmission module transmits the broadcast message on the first downlink carrier, receive a random access request transmitted by the terminal device on the second uplink carrier based on the random access configuration information, for random access of the terminal device.

In one embodiment, the broadcast message further includes second uplink configuration information corresponding to the second uplink carrier; and the second uplink configuration information includes second uplink frequency information of the second uplink carrier.

In one embodiment, the broadcast message further includes first uplink configuration information corresponding to a first uplink carrier; and the first uplink configuration information includes first uplink frequency information of the first uplink carrier.

In one embodiment, the network device further includes:

a third receiving module configured to: after the third transmission module transmits the broadcast message on the first downlink carrier, receive an uplink signal transmitted by the terminal device on the first uplink carrier based on the first uplink configuration information.

In one embodiment, the first uplink carrier is a serving carrier of the terminal device.

According to a fifth aspect, this application provides a computer program, where when the program is executed by a processor, the program is used to perform the method in the first aspect.

According to a sixth aspect, this application provides a computer program, where when the program is executed by a processor, the program is used to perform the method in the second aspect.

A seventh aspect provides a program product, for example, a computer-readable storage medium, including the program in the fifth aspect.

An eighth aspect provides a program product, for example, a computer-readable storage medium, including the program in the sixth aspect.

A ninth aspect provides a computer program product including an instruction, where when the computer program product runs on a computer, the computer is enabled to perform the method in any one of the foregoing aspects.

A tenth aspect provides a computer-readable storage medium, where the computer-readable storage medium stores an instruction, and when the instruction runs on a computer, the computer is enabled to perform the method in any one of the foregoing aspects.

Obviously, in the foregoing aspects, the terminal device may obtain, from the first downlink carrier, configuration information that is not of a serving carrier of the current terminal device, so that the terminal device transmits an uplink signal based on the configuration information that is not of the serving carrier of the current terminal device. Further, configuration information corresponding to an NR high-frequency downlink carrier is not used to obtain downlink reference information for transmitting a signal on an LTE low-frequency uplink carrier; instead, LTE low-frequency downlink carrier configuration information carried on the NR high-frequency downlink carrier may be used to transmit the signal on the LTE low-frequency uplink carrier. This helps improve system performance in an NR-LTE coexistence scenario.

BRIEF DESCRIPTION OF DRAWINGS

FIG. 3 is a schematic flowchart of a method for transmitting and receiving information according to one embodiment;

FIG. 4 is a signaling diagram of a method for transmitting and receiving information according to one embodiment;

DESCRIPTION OF EMBODIMENTS

Embodiments of this application are applied to a 5G communications system or other systems that may emerge in the future. The following describes some terms in this application for ease of understanding by a person skilled in the art. It should be noted that, when the solutions in the embodiments of this application are applied to the 5G system or other systems that may emerge in the future, names of a network device and a terminal device may change, but this does not affect implementation of the solutions in the embodiments of this application.

(1) A terminal device, also referred to as a terminal or user equipment, is a device providing voice and/or data connectivity for a user, for example, a hand-held device or a vehicle-mounted device that has a wireless connection function. For example, common terminal devices include a mobile phone, a tablet computer, a notebook computer, a palmtop computer, a mobile Internet device (MID), and a wearable device. For example, the wearable device includes a smartwatch, a smart band, or a pedometer.

(2) A network device, also referred to as a radio access network (RAN) device, is a device that enables the terminal device to access a wireless network. Network devices include network devices in various communications standards, for example, including but not limited to a base station, an evolved NodeB (eNB), a radio network controller (RNC), a NodeB (NB), a network device controller (e.g., base station controller (BSC)), a network device transceiver (e.g., base transceiver station (BTS)), a home network device (for example, a home evolved NodeB or a home NodeB (HNB)), and a baseband unit (BBU).

(3) Network devices include network devices in various frequency standards, for example, including but not limited to a low-frequency network device and a high-frequency network device.

(4) "A plurality of" refers to two or more, and other quantifiers are similar to this. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Figure 2:
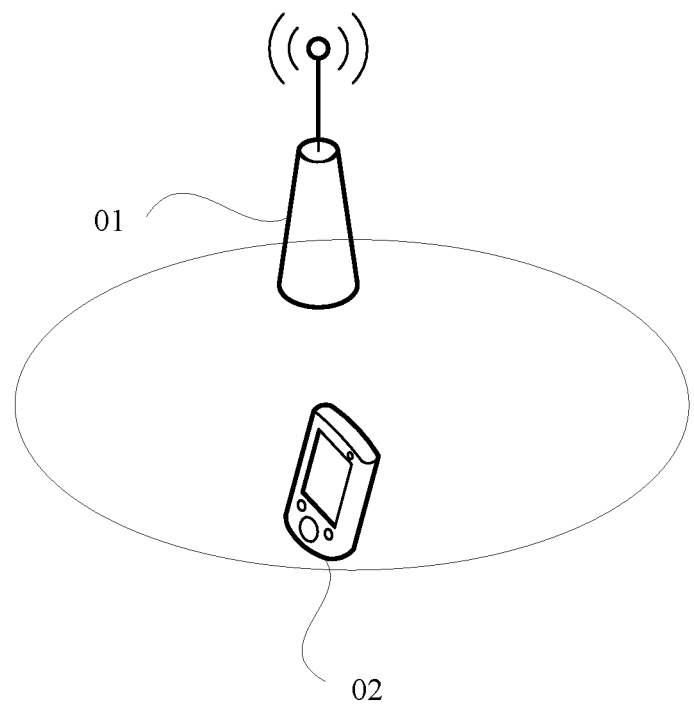
FIG. 2 is a schematic diagram of an application scenario according to one embodiment.

FIG. 2 is a schematic diagram of an application scenario according to one embodiment. A networking architecture shown in FIG. 2 mainly includes a network device and a terminal device. The network device may use a millimeter-wave band that has a relatively higher frequency to communicate with the terminal device, where the millimeter-wave band is generally a band higher than 3.5 GHz, for example, 3.5 GHz, 28 GHz, or 38 GHz. In addition, the network device may use a relatively low-frequency band to communicate with the terminal device, where the low-frequency band is generally a band lower than 3.5 GHz, for example, 1.5 GHz, or 800 MHz. Further, the network device supports a plurality of bands, and supports high frequencies and low frequencies.

The network device in the embodiments of this application may be a network-side device that works at a band lower than 3.5 GHz and supports a band higher than 3.5 GHz (including 3.5 GHz), for example, a Wireless Fidelity (Wi- Fi) access point, or a next-generation communications base station, for example, a 5G gNB, a small cell, a micro cell, or a TRP, or may be a relay station, an access point, a vehicle-mounted device, a wearable device, or the like that works at a high-frequency band.

The terminal device in the embodiments of this application may be referred to as an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal in a 5G network, or the like. The terminal device in the embodiments of this application may be a terminal supporting NR, or may be a terminal supporting a future LTE release, for example, a terminal supporting an LTE release 15 and a later release.

Before the embodiments of this application are described, first, an LTE system is described. In consideration of improving power efficiency of a device, prolonging a standby time of a battery, and reducing device costs, downlink transmission of the LTE system is implemented based on OFDMA, and uplink transmission of the LTE system is implemented based on single carrier frequency division multiple access (SC-FDMA). A time-frequency resource is divided into a time-domain symbol in a time domain dimension and a subcarrier in a frequency domain dimension, where the time-domain symbol is an OFDM symbol or an SC-FDMA symbol. A smallest resource granularity is referred to as a resource element (RE), and represents a time-frequency grid formed by a time-domain symbol in time domain and a subcarrier in frequency domain. In the LTE system, a basic time unit for scheduling is generally a subframe whose duration is 1 ms. One subframe generally includes two slots, and one slot generally includes seven time-domain symbols. A resource block formed by all time-domain symbols in a slot and 12 subcarriers in frequency domain is referred to as a resource block (RB). The RB is a basic unit for LTE resource scheduling. In one embodiment, in the LTE system, a basic frequency unit for scheduling is a frequency-domain width of a resource block RB. One RB includes 12 subcarriers in frequency domain, and occupies duration of one subframe in time domain. In a system evolved from LTE, introduction of a shorter time scheduling unit, for example, a scheduling mode using one slot or even several time-domain symbols as a unit, is further considered. LTE supports two duplex modes: frequency division duplex (FDD) and time division duplex (TDD). For FDD, downlink transmission and uplink transmission are performed on different carriers. For TDD, uplink transmission and downlink transmission are performed on a same carrier at different time. One carrier includes a downlink subframe, an uplink subframe, and a special subframe, where the special subframe includes three parts: a DwPTS, a GP, and a UpPTS. The GP is mainly used to compensate for a downlink-to-uplink component switch time and a propagation delay. Currently, the LTE system is mainly deployed in a low band, for example, from 800 MHz to 2 GHz approximately.

Next, a 5G technology is described. The 5G technology needs to support a downlink rate up to 10 Gbps. A spectrum range used by the 5G technology is very wide, for example, from a band lower than 6 GHz to a 100 GHz band. Therefore, a high-frequency technology is a problem necessarily to be considered in 5G. During transmission of a high-frequency signal, the high-frequency signal is easily affected by a transmission condition; therefore, quality of the high-frequency signal is very poor. To enhance the high-frequency signal, a beamforming technology is generally used to enhance transmission performance of the high-frequency signal by using a gain antenna.

As shown in FIG. 2, a network device 01 includes at least one cell, a terminal device 02 is located on the cell of the network device 01, and a communication action is generated between the terminal device 02 and the network device 01. FIG. 3 is a schematic flowchart of a method for transmitting and receiving information according to one embodiment. As shown in FIG. 3, the method includes:

S101. A terminal device receives, on a first downlink carrier, a broadcast message transmitted by a network device, where the broadcast message includes second downlink configuration information corresponding to a second downlink carrier.

The second downlink configuration information includes second downlink frequency information and/or physical cell identifier information of the second downlink carrier, the first downlink carrier and a second uplink carrier are serving carriers of the terminal device, the second downlink carrier is not a serving carrier of the terminal device, and the second downlink carrier and the second uplink carrier are paired carriers on a system level.

The broadcast message further includes second uplink configuration information corresponding to the second uplink carrier, and the second uplink configuration information includes second uplink frequency information of the second uplink carrier.

In addition, the first downlink carrier is located on a first band, the second uplink carrier and the second downlink carrier are located on a second band, and a frequency of the first band is higher than a frequency of the second band.

FIG. 4 is a signaling diagram of a method for transmitting and receiving information according to one embodiment. FIG. 4 is used to perform a procedure of the method provided in FIG. 3 for transmitting and receiving information. As shown in FIG. 4, the method includes the following step.

S11. The terminal device receives, on the first downlink carrier, the broadcast message transmitted by the network device, where the broadcast message includes the second downlink configuration information corresponding to the second downlink carrier.

The second downlink configuration information includes the second downlink frequency information and/or the physical cell identifier information of the second downlink carrier, the first downlink carrier and the second uplink carrier are the serving carriers of the terminal device, the second downlink carrier is not the serving carrier of the terminal device, and the second downlink carrier and the second uplink carrier are paired carriers on a system level. The broadcast message further includes the second uplink configuration information corresponding to the second uplink carrier, and the second uplink configuration information includes the second uplink frequency information of the second uplink carrier. In addition, the first downlink carrier is located on the first band, the second uplink carrier and the second downlink carrier are located on the second band, and the frequency of the first band is higher than the frequency of the second band.

Figure 1:
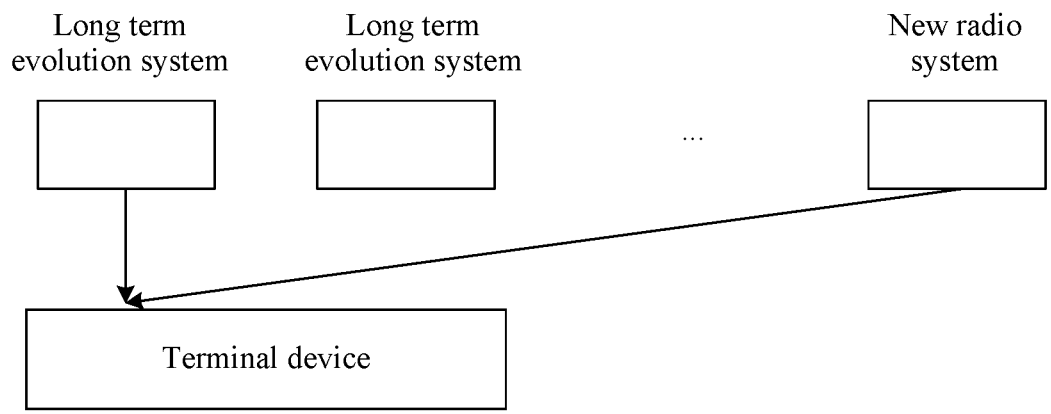
FIG. 1 is a diagram of a deployment scenario in which NR and LTE coexist in the prior art.

In this embodiment, in the prior art, in a scenario shown in FIG. 1, a terminal device uses an NR downlink carrier and an LTE uplink carrier as serving carriers. In the prior art, an uplink carrier corresponding to the NR downlink carrier is the LTE uplink carrier, but a frequency difference between the NR downlink carrier and the LTE uplink carrier is relatively great. For example, a network device transmits a downlink signal on an NR uplink (UL)/TDD carrier, and the terminal device within a management scope of the network device receives the downlink signal based on a requirement of the terminal device; and the terminal device transmits an uplink signal on an FDD downlink (DL) carrier to the network device. In this case, an LTE downlink carrier is not configured as a serving carrier of the terminal device. Therefore, when the terminal device transmits the uplink signal on the LTE uplink carrier to the network device, reference information required for transmitting the uplink signal is obtained through calculation based on the NR downlink carrier.

In the solution of this application, after the terminal device accesses the network device, and the terminal device establishes a radio resource control (RRC) connection to the network device, a carrier carrying an uplink signal or a downlink signal for communication between the terminal device and the network device is referred to as a serving carrier of the terminal device. For example, after the terminal device establishes the RRC connection to the network device, the terminal device transmits an uplink signal A on an uplink carrier A to the network device, and in this case, the uplink carrier A is a serving carrier of the terminal device. For another example, after the terminal device establishes the RRC connection to the network device, the terminal device receives, on a downlink carrier B, a downlink signal B transmitted by the network device, and in this case, the downlink carrier B is a serving carrier of the terminal device. For another example, after the terminal device establishes the RRC connection to the network device, the terminal device receives, on a downlink carrier C, a downlink signal C transmitted by the network device; after the terminal device performs processing, the terminal device transmits an uplink signal D on an uplink carrier D to the network device; and in this case, the downlink carrier C and the uplink carrier D are both serving carriers of the terminal device, and the downlink carrier C and the uplink carrier D may be referred to as a pair of serving carriers of the terminal device. In the solution of this application, after the terminal device establishes the RRC connection to the network device, the terminal device receives, on the first downlink carrier, the broadcast message transmitted by the network device; therefore, the first downlink carrier is a serving carrier of the terminal device. In a subsequent process, the terminal device transmits an uplink signal on the second uplink carrier to the network device; therefore, the second uplink carrier is a serving carrier of the terminal device. However, the terminal device does not receive, on the second downlink carrier, a downlink signal transmitted by the network device; therefore, the second downlink carrier is not a serving carrier of the terminal device.

In the solution of this application, the first downlink carrier supported by the network device and the terminal device is an NR DL carrier. For example, the first downlink carrier may be an NR-only DL carrier, or a DL carrier in NR TDD, or a DL carrier in NR FDD. The first downlink carrier may be deployed in the first band, and a band whose frequency is higher than or equal to 2.5 GHz may be selected. For example, the frequency of the first downlink carrier is 20 GHz to 30 GHz, or the frequency of the first downlink carrier is 3.5 GHz.

Correspondingly, an uplink carrier corresponding to the first downlink carrier is the second uplink carrier. The second uplink carrier supported by the network device and the terminal device is an LTE UL carrier. The second uplink carrier is located on the second band. The frequency of the first band is higher than the frequency of the second band. The second uplink carrier may be deployed in a low band. For example, the second uplink carrier is an LTE FDD UL carrier in an 800 MHz or 2 GHz band, or a TDD UL carrier in an 800 MHz or 2 GHz band.

For the first downlink carrier used as a downlink carrier, the uplink carrier corresponding to the first downlink carrier is the second uplink carrier. Therefore, it can be known that the first downlink carrier and the second uplink carrier are serving carriers of the current terminal device.

A process in which the terminal device receives a broadcast message transmitted by the network device on the first downlink carrier is as follows: As shown in FIG. 4, the network device transmits a broadcast message on the first downlink carrier to the current terminal device, where the broadcast message carries cell-level information of the first downlink carrier, for example, DL bandwidth information of the first downlink carrier and/or basic structure information of the carrier; the broadcast message further carries the second downlink configuration information corresponding to the second downlink carrier, and the second uplink configuration information corresponding to the second uplink carrier; the second downlink configuration information includes the second downlink frequency information and/or physical cell identifier information of the second downlink carrier; and the second uplink configuration information includes the second uplink frequency information of the second uplink carrier. After the terminal device receives the broadcast message, the terminal device may determine a specific frequency domain position of the second downlink carrier based on the second downlink frequency information. The physical cell identifier information may indicate which network device or which LTE cell near the terminal device manages the network-device-side second downlink carrier corresponding to the second uplink carrier. Therefore, in this application, the terminal device does not need to search for cell identities of other LTE cells, and based on the physical cell identifier information, the terminal device can accurately determine the LTE cell that manages the second downlink carrier.

In this application, the second downlink carrier is not a serving carrier of the current terminal device, and the network device does not transmit a downlink signal to the current terminal device by using the second downlink carrier. In addition, the second downlink carrier is located on the second band, and the second downlink carrier may be deployed in a low band. For example, the second downlink carrier is an LTE FDD UL carrier in an 800 MHz or 2 GHz band, or a TDD UL carrier in an 800 MHz or 2 GHz band. In this application, the second uplink carrier and the second downlink carrier may be deployed at a same frequency in the second band.

In this application, the second downlink carrier and the second uplink carrier are paired carriers on the system level.

First, paired carriers on the system level are defined as a downlink carrier and an uplink carrier that are paired. A first terminal device within the management scope of the network device performs downlink access from the downlink carrier, and the first terminal device reads random access configuration information of the uplink carrier from the downlink carrier. Further, the terminal device initiates random access on the uplink carrier based on the random access configuration information, and finally, the terminal device completes RRC connection establishment. The uplink carrier and the downlink carrier that can complete the foregoing function may be referred to as paired carriers on the system level. For example, a terminal device M within the management scope of the network device performs downlink access from a downlink carrier E, and the terminal device M reads random access configuration information of an uplink carrier F from the downlink carrier E; further, the terminal device M initiates random access on the uplink carrier F based on the random access configuration information; and the terminal device M completes RRC connection establishment. In this case, the downlink carrier E and the uplink carrier F are paired carriers on the system level.

Two sets of paired carriers on the system level are used in the solution of this application. One set of paired carriers on the system level is the first downlink carrier and the second uplink carrier. In one embodiment, a terminal device supporting NR performs access from the first downlink carrier, and reads random access configuration information of the second uplink carrier from the first downlink carrier; further, the terminal device supporting NR initiates random access on the second uplink carrier based on the random access configuration information; and finally the terminal device supporting NR completes RRC connection establishment. Herein, the first downlink carrier and the second uplink carrier are paired carriers on the system level. The other set of paired carriers on the system level is the second downlink carrier and the second uplink carrier. Specifically, a terminal device supporting LTE performs access from the second downlink carrier, and reads random access configuration information of the second uplink carrier from the second downlink carrier; further, the terminal device supporting LTE initiates random access on the second uplink carrier based on the random access configuration information; and finally the terminal device supporting LTE completes RRC connection establishment. Herein, the second downlink carrier and the second uplink carrier are paired carriers on the system level.

In this application, the second uplink carrier is a serving carrier of the current terminal device, and the second downlink carrier is not a serving carrier of the terminal device. However, the second downlink configuration information of the second downlink carrier is placed in the broadcast information of the first uplink carrier, so that when an uplink signal is transmitted on the second uplink carrier, the second downlink configuration information of the second downlink carrier may be used as a basis. The terminal device does not need to receive downlink service data from the second downlink carrier, but may transmit uplink service data to the network device by using the second uplink carrier. For example, in this application, the second downlink carrier and the second uplink carrier are a pair of FDD carriers on the system level, or the second downlink carrier and the second uplink carrier are a pair of TDD carriers on the system level. However, the second downlink carrier and the second uplink carrier used in this application may be serving carriers of another terminal device. For example, the second downlink carrier and the second uplink carrier may be used as a pair of serving carriers of another terminal device supporting LTE; or the second downlink carrier and the second uplink carrier may be used as a pair of serving carriers of another terminal device supporting NR. When the second downlink carrier and the second uplink carrier are used as a pair of serving carriers of another terminal device, the terminal device may also receive, on the second downlink carrier, a broadcast message transmitted by the network device. In this case, the broadcast message may include configuration information of the second uplink carrier such as frequency information and bandwidth information, random access configuration information of the second uplink carrier, or the like.

In this application, a specific name of the broadcast message transmitted by the network device on the first downlink carrier to the current terminal device is not limited in this application. In addition, information in the broadcast message may be carried in one broadcast message or a plurality of pieces of broadcast information, or information in the broadcast message may be carried in one or more information elements in higher layer signaling. In one embodiment, the broadcast message received by the terminal device in this application is not limited to one broadcast message or one broadcast channel either. For example, basic cell information of the first downlink carrier, the second uplink configuration information, and the second downlink configuration information may be carried in different broadcast messages respectively. For example, basic cell information of the first downlink carrier is carried in an NR master system block (MIB), and the second uplink configuration information and the second downlink configuration information are carried in an NR system information block (SIB). For another example, basic cell information of the first downlink carrier, the second uplink configuration information, and the second downlink configuration information are all carried in an NR SIB. Further, the terminal device discovers the first downlink carrier by detecting an NR synchronization signal, for example, discovers the first downlink carrier by using an NR primary synchronization sequence (PSS) and a secondary synchronization sequence (SSS). For example, the terminal device may identify the first downlink carrier by using sequence information of the NR PSS and the SSS, and then the terminal device reads the broadcast information transmitted by the network device on the first downlink carrier.

In this embodiment, the terminal device receives, on the first downlink carrier, the broadcast message transmitted by the network device, where the broadcast message includes the second downlink configuration information corresponding to the second downlink carrier, the second downlink configuration information includes the second downlink frequency information and/or physical cell identifier information of the second downlink carrier, the first downlink carrier and the second uplink carrier are serving carriers of the terminal device, the second downlink carrier is not a serving carrier of the terminal device, and the second downlink carrier and the second uplink carrier are paired carriers on the system level. Therefore, the terminal device obtains, from the first downlink carrier, the second downlink configuration information corresponding to the second downlink carrier and transmitted by the network device, where the first downlink carrier is a serving carrier of the terminal device, but the second downlink carrier is not a serving carrier of the terminal device. The terminal device may determine, based on the second downlink configuration information corresponding to the second downlink carrier, reference information for transmitting a signal on the second uplink carrier, where the second uplink carrier is a serving carrier of the terminal device. Further, the terminal device may obtain, from the first downlink carrier, configuration information that is not of a serving carrier of the current terminal device, so that the terminal device transmits an uplink signal based on the configuration information that is not of the serving carrier of the current terminal device. Further, configuration information corresponding to an NR high-frequency downlink carrier is not used to obtain downlink reference information for transmitting a signal on an LTE low-frequency uplink carrier; instead, LTE low-frequency downlink carrier configuration information carried on the NR high-frequency downlink carrier may be used to transmit the signal on the LTE low-frequency uplink carrier. This helps improve system performance in an NR-LTE coexistence scenario.

Figure 5:
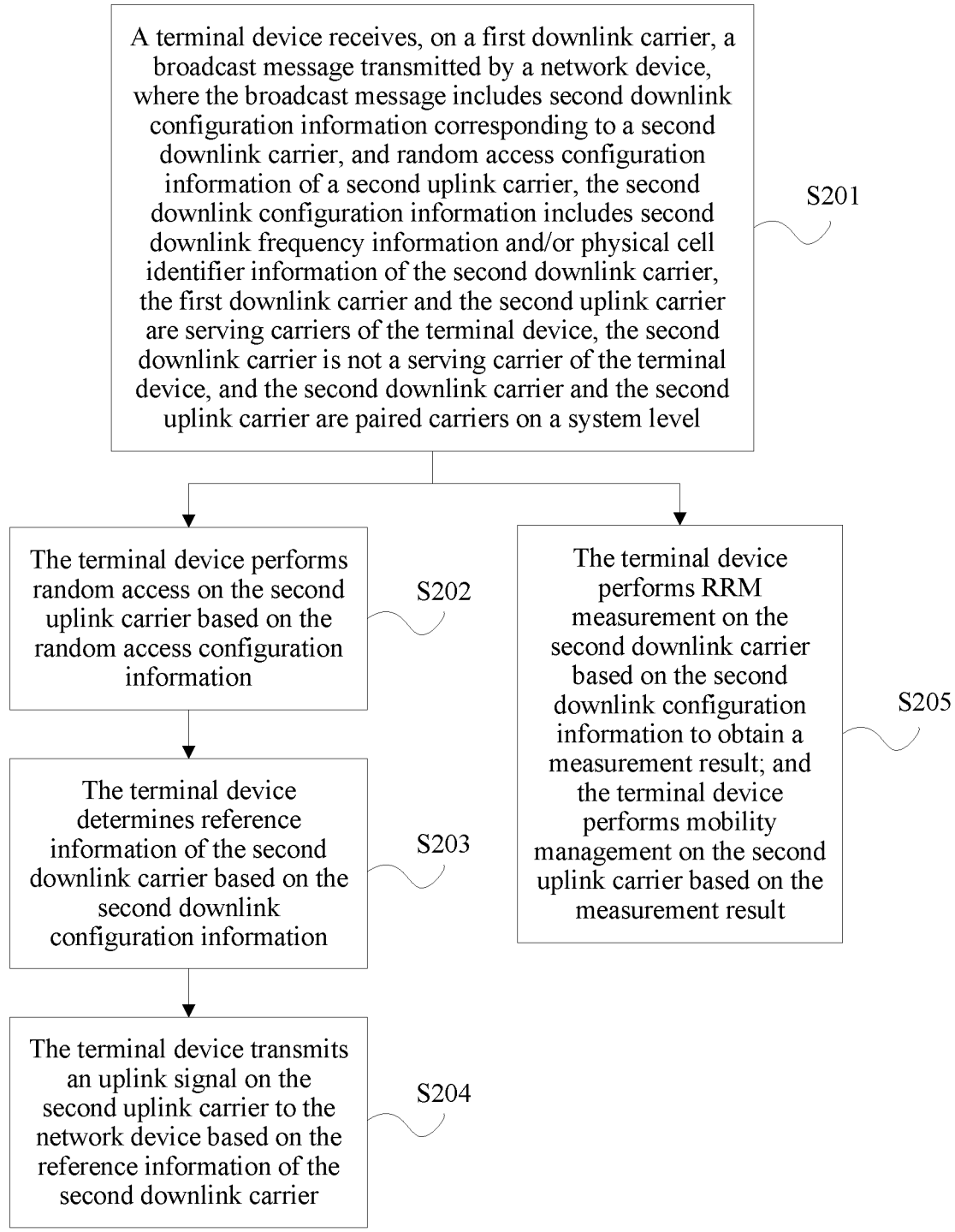
FIG. 5 is a schematic flowchart of another method for transmitting and receiving information according to one embodiment.

FIG. 5 is a schematic flowchart of another method for transmitting and receiving information according to one embodiment. As shown in FIG. 5, on a basis of the embodiment shown in FIG. 3, the method includes the following steps.

S201. A terminal device receives, on a first downlink carrier, a broadcast message transmitted by a network device, where the broadcast message includes second downlink configuration information corresponding to a second downlink carrier, and random access configuration information of a second uplink carrier, the second downlink configuration information includes second downlink frequency information and/or physical cell identifier information of the second downlink carrier, the first downlink carrier and the second uplink carrier are serving carriers of the terminal device, the second downlink carrier is not a serving carrier of the terminal device, and the second downlink carrier and the second uplink carrier are paired carriers on a system level.

S202. The terminal device performs random access on the second uplink carrier based on the random access configuration information.

S203. The terminal device determines reference information of the second downlink carrier based on the second downlink configuration information. The reference information includes at least one of the following: a reference path loss, a reference downlink receive timing, reference time synchronization information, and reference frequency synchronization information.

S204. The terminal device transmits an uplink signal on the second uplink carrier to the network device based on the reference information of the second downlink carrier.

After S201, the method further includes:

S205. The terminal device performs RRM measurement on the second downlink carrier based on the second downlink configuration information to obtain a measurement result; and the terminal device performs mobility management on the second uplink carrier based on the measurement result.

S202 to S204 may be implemented separately from S205, or may be implemented simultaneously with S205. This is not limited in this application.

Figure 6:
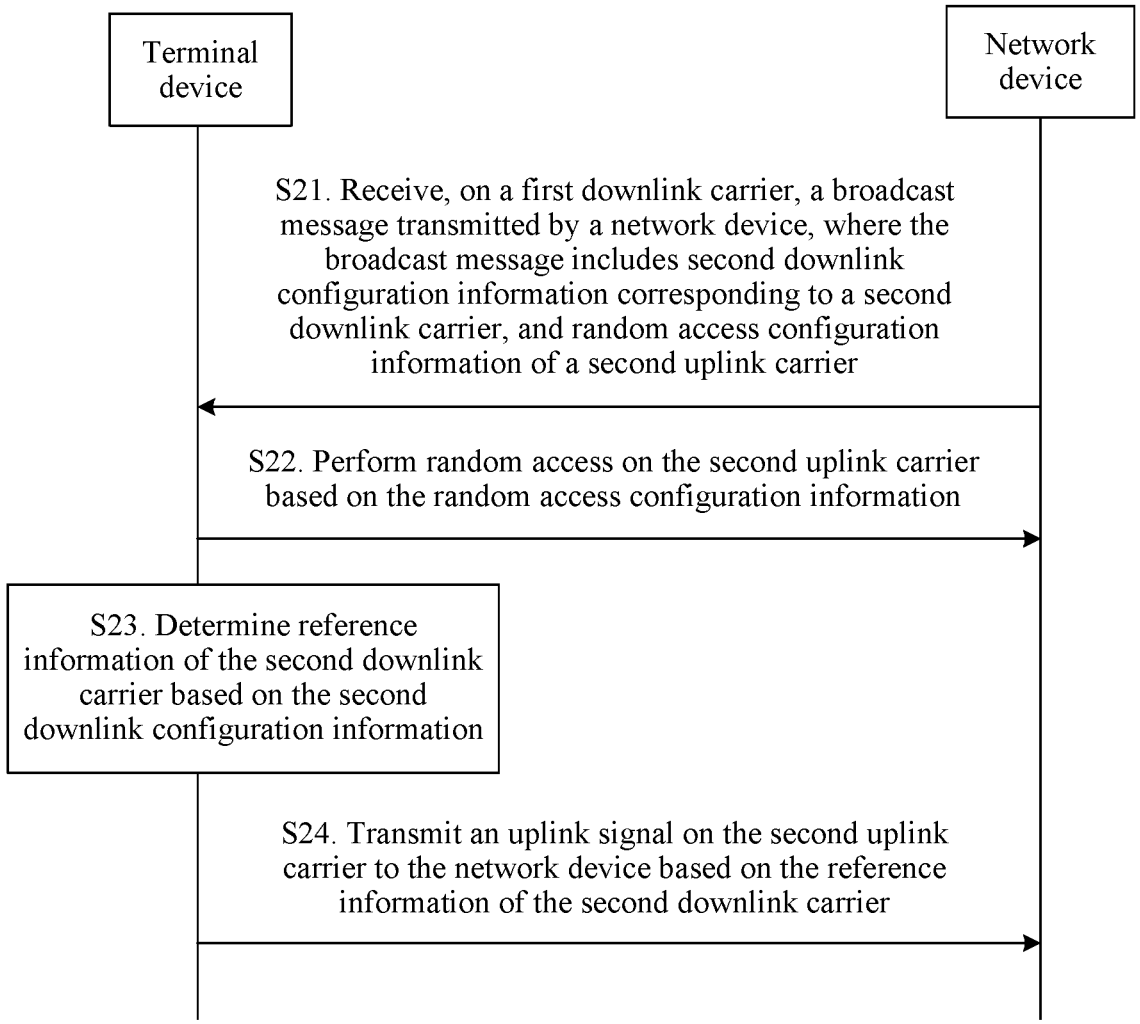
FIG. 6 is a signaling diagram 1 of another method for transmitting and receiving information according to one embodiment.

FIG. 6 is a signaling diagram 1 of another method for transmitting and receiving information according to an embodiment of this application. FIG. 6 is used to perform a procedure of the other method provided in FIG. 5 for transmitting and receiving information. As shown in FIG. 6, the method includes the following steps.

S21. A terminal device receives, on a first downlink carrier, a broadcast message transmitted by a network device, where the broadcast message includes second downlink configuration information corresponding to a second downlink carrier, and random access configuration information of a second uplink carrier.

The second downlink configuration information includes second downlink frequency information and/or physical cell identifier information of the second downlink carrier, the first downlink carrier and the second uplink carrier are serving carriers of the terminal device, the second downlink carrier is not a serving carrier of the terminal device, and the second downlink carrier and the second uplink carrier are paired carriers on a system level.

In this embodiment, the network device transmits the broadcast message on the first downlink carrier, and the terminal device within a management scope of the network device receives the broadcast message on the first downlink carrier based on a requirement of the terminal device. For a process of this step, refer to step S11 in the signaling diagram of the method provided in FIG. 4 for transmitting and receiving information. The principle and process thereof are the same as those of step S11.

However, in S21 in FIG. 6, the broadcast message further includes the random access configuration information of the second uplink carrier, where the random access configuration information may be sequence related information and/or time-frequency resource information of a preamble, or the like.

S22. The terminal device performs random access on the second uplink carrier based on the random access configuration information.

In this embodiment, after the terminal device detects the broadcast message, the terminal device first needs to perform random access based on the random access configuration information. The terminal device may perform random access based on the random access configuration information by using any conventional random access method. In this embodiment, the random access method is not limited.

Figure 7:
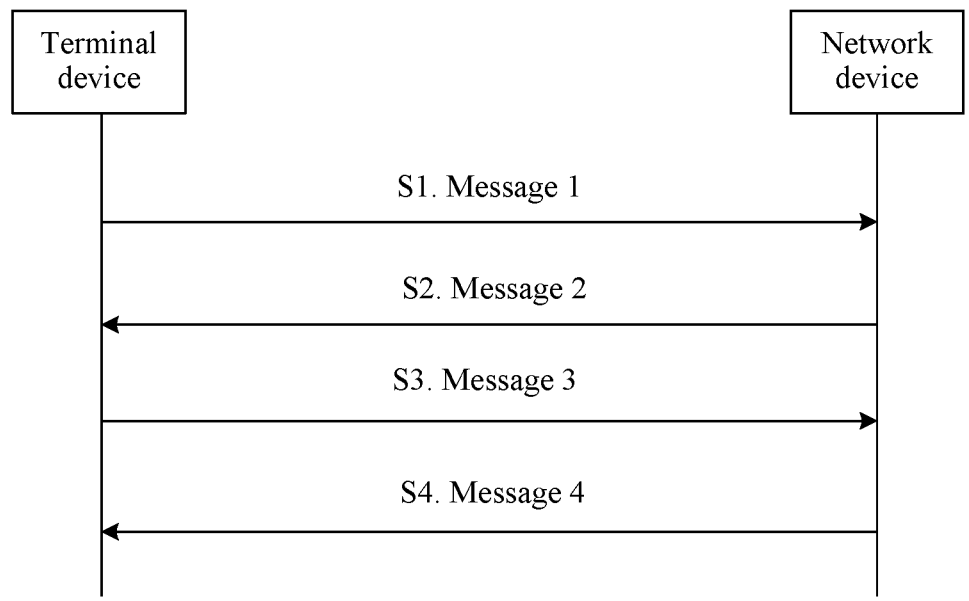
FIG. 7 is a signaling diagram of a random access process in another method for transmitting and receiving information according to one embodiment.

For example, FIG. 7 is a signaling diagram of a random access process in another method for transmitting and receiving information according to one embodiment. As shown in FIG. 7, a terminal device needs to perform random access on a second uplink carrier. In step S1, the terminal device transmits a message 1 to a network device, where the message 1 is a preamble, and the preamble is a preamble of an access channel. In step S2, the network device returns a message 2 to the terminal device, where the message 2 is a random access response message. In step S3, the terminal device transmits a message 3 to the network device. Generally, the message 3 is a message of an RRC type. However, when random access is initiated at a Media Access Control (MAC) layer, the message 3 is not a message of the RRC type. For example, the message 3 may include an RRC message, for example, a service request, a resume request, or random access initiated at the MAC layer. In step S4, the network device returns a message 4 to the terminal device, where the message 4 is a contention resolution message; and the terminal device may determine, based on the contention resolution message, that contention in the current random access process is successful.

For another example, alternatively, when a terminal device needs to perform random access based on random access configuration information, a two-step random method may be used. In a two-step random access process, the terminal device may transmit a message 1 and a message 3 to a network device, where the message 1 is a preamble; and the network device returns a message 2 and a message 4 to the terminal device, where the message 2 is a random access response message, and the message 4 is a contention resolution message. Finally, the terminal device may establish an RRC connection to the network device.

S23. The terminal device determines reference information of the second downlink carrier based on the second downlink configuration information. The reference information includes at least one of the following: a reference path loss, a reference downlink receive timing, reference time synchronization information, and reference frequency synchronization information.

In this embodiment, the terminal device needs to calculate the reference information of the second downlink carrier based on the second downlink configuration information. When calculating the reference information of the second downlink carrier, the terminal device may calculate any one or more of the reference path loss, the reference downlink receive timing, the reference time synchronization information, and the reference frequency synchronization information.

In this application, a process of calculating the reference path loss of the second downlink carrier is as follows:

The second downlink configuration information corresponding to the second downlink carrier carries a configured transmit power value of a reference signal on the second downlink carrier, where the reference signal may be a cell-specific reference signal (CRS) or another reference signal, for example, a channel state information reference signal (CSI-RS), and a sequence of the reference signal is determined by the physical cell identifier included in the second downlink configuration information; the terminal device may measure, based on the second downlink configuration information, the reference signal transmitted on the second downlink carrier, and further obtain a received power value of the measured reference signal in a measurement process; then the terminal device obtains, based on the transmit power value of the reference signal that is included in the second downlink configuration information and the received power value obtained through measurement, a reference path loss corresponding to a frequency of the second downlink carrier; and then the terminal device may calculate, based on the determined reference path loss, an actual transmit power value of an uplink signal transmitted by the terminal device on the second uplink carrier. For example, using an uplink data channel (e.g., physical uplink shared channel (PUSCH)) in an LTE system as an example a formula PL=referenceSignalPower−higher layer filtered RSRP may be used, where PL is a reference path loss referenceSignalPower is a configured transmit power value of a reference signal notified by using higher layer signaling, and higher layer filtered RESRP is a received power value when the terminal device measures, based on the second downlink configuration information, the reference signal transmitted on the second downlink carrier. In a process of obtaining the received power value through measurement, the terminal device serves as a receive end. As can be seen from the foregoing formula, after the received power value is subtracted from the configured transmit power value, a value of the reference path loss PL between the network device and the terminal device may be obtained; and then by using a formula $$P_{PUSCH}(i) = \min\{P_{CMAX}, 10 \log_{10}(M_{PUSCH}(i)) + P_{O\_PUSCH}(j) + \alpha(j) \cdot PL + \Delta_{TF}(i) + f(i)\},$$

an actual transmit power value of the uplink signal transmitted by the terminal device on the second uplink carrier is obtained, where $P_{CMAX}$ is maximum transmit power configured for the current terminal device, $M_{PUSCH}(i)$ is a bandwidth width allocated to the current PUSCH, $P_{O\_PUSCH}$ is a preset parameter configured by using higher layer signaling, $\alpha(j)$ is a compensation factor, $\Delta_{TF}(i)$ is a parameter related to a modulation and coding scheme (Modulation and Coding Scheme, MCS) of the current PUSCH, f(i) is a power adjustment value related to closed-loop power, i is a subframe index, and j is a scenario identifier for transmitting a PUSCH in different scenarios. Similarly, actual transmit power values of other uplink channels, for example, an uplink control channel and an uplink reference signal, may all be calculated by using the foregoing formula.

In a scenario shown in FIG. 1, if a first downlink carrier is an NR DL carrier, and a second downlink carrier is an LTE DL carrier, and a second uplink carrier is an LTE UL carrier, a terminal device receives, on the NR DL carrier, a broadcast message transmitted by a network device, where the broadcast message includes LTE DL configuration information corresponding to the LTE DL carrier, and the LTE DL configuration information includes a configured transmit power value of a reference signal of the LTE DL carrier. The terminal device may measure, based on the LTE DL configuration information, the reference signal transmitted on the LTE DL carrier, and obtain a received power value. The terminal device obtains, through calculation based on the configured transmit power value in the LTE DL configuration information and the received power value currently obtained through calculation, a reference path loss corresponding to a frequency of the LTE DL carrier. The terminal device calculates, based on the reference path loss corresponding to the frequency of the LTE DL carrier, an actual transmit power value when the terminal device transmits an uplink signal on the LTE UL carrier.

In the prior art, if a first downlink carrier is an NR DL carrier, and a second uplink carrier is an LTE UL carrier, a terminal device receives, on the NR DL carrier, a broadcast message transmitted by a network device, where the broadcast message includes NR DL configuration information corresponding to the NR DL carrier, and the NR DL configuration information includes a configured transmit power value of a reference signal of the NR DL carrier. The terminal device may measure, based on the NR DL configuration information, the reference signal transmitted on the NR DL carrier, and obtain a received power value. The terminal device obtains, through calculation based on the configured transmit power value in the NR DL configuration information and the received power value currently obtained through calculation, a reference path loss corresponding to a frequency of the NR DL carrier. The terminal device calculates, based on the reference path loss corresponding to the frequency of the NR DL carrier, an actual transmit power value when the terminal device transmits an uplink signal on the LTE UL carrier.

NR is deployed in a high band, generally 3.5 GHz or even scores of GHz, but LTE is deployed in a low band, generally 800 MHz or 2 GHz. Therefore, there is a relatively great frequency difference between NR and LTE. In the prior art, the reference path loss obtained through measurement by the terminal device based on the reference signal transmitted on the NR downlink carrier can only represent a reference path loss in an NR band, but cannot represent a reference path loss when the terminal device transmits the uplink signal on the LTE uplink carrier.

However, in this application, the reference path loss obtained through measurement based on the reference signal transmitted on the LTE downlink carrier can represent a reference path loss in an LTE band, and can represent a reference path loss when the terminal device transmits the uplink signal on the LTE uplink carrier. Therefore, the manner of calculating the reference path loss in this application is more accurate than the manner of obtaining the reference path loss through measurement based on the reference signal transmitted on the NR downlink carrier in the prior art.

In this application, a process of calculating the reference downlink receive timing of the second downlink carrier is as follows:

The terminal device may measure, based on the second downlink configuration information, a downlink signal transmitted on the second downlink carrier. For example, the downlink signal may be a downlink synchronization signal or a downlink reference signal. Further, the terminal device obtains the downlink receive timing of the second downlink carrier through measurement. Then the terminal device uses the downlink receive timing as a reference, and adds a preset current uplink transmit timing advance to the downlink receive timing to obtain an uplink transmit timing, where the uplink transmit timing may also be referred to as an uplink transmit advance.

Figure 8:
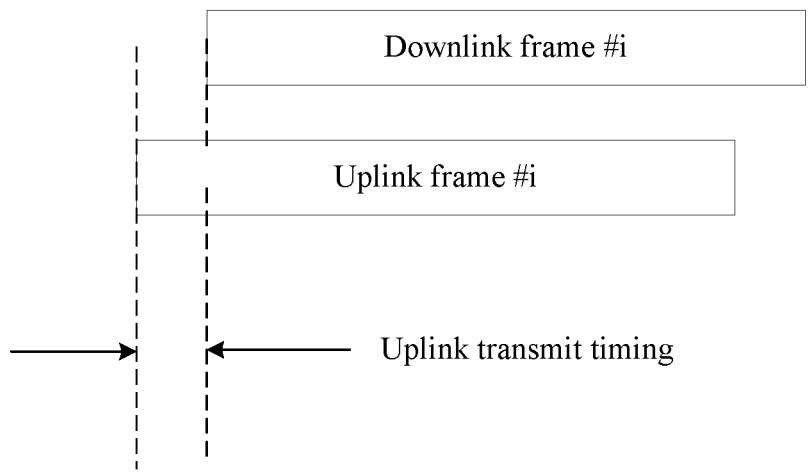
FIG. 8 is a schematic diagram for calculating an uplink transmit timing in another method for transmitting and receiving information according to one embodiment.

In a scenario shown in FIG. 1, if a first downlink carrier is an NR DL carrier, and a second downlink carrier is an LTE DL carrier, and a second uplink carrier is an LTE UL carrier, a terminal device receives, on the NR DL carrier, a broadcast message transmitted by a network device, where the broadcast message includes LTE DL configuration information corresponding to the LTE DL carrier. FIG. 8 is a schematic diagram for calculating an uplink transmit timing in another method for transmitting and receiving information according to one embodiment. As shown in FIG. 8, to specify a frame structure, a standard protocol generally uses an uplink transmit advance mechanism of a terminal device. Therefore, the terminal device measures, based on LTE DL configuration information, a downlink signal transmitted on an LTE DL carrier, to obtain a downlink receive timing $N_{TA}$ of the LTE DL carrier. The terminal device may obtain an uplink transmit timing based on the downlink receive timing $N_{TA}$ and a current uplink transmit timing advance $N_{TAoffset}$. For example, the terminal device may obtain the uplink transmit timing by using a formula $(N_{TA}+N_{TAoffset}) \times T_s$, where $T_s$ is a basic time unit.

In the prior art, if a first downlink carrier is an NR DL carrier, and a second uplink carrier is an LTE UL carrier, a terminal device receives, on the NR DL carrier, a broadcast message transmitted by a network device, where the broadcast message includes NR DL configuration information corresponding to the NR DL carrier. The terminal device measures, based on the NR DL configuration information, a downlink signal transmitted on the NR DL carrier, to obtain a downlink receive timing $N'_{TA}$ of the NR DL carrier. The terminal device may obtain an uplink transmit timing based on the downlink receive timing $N'_{TA}$ and a current uplink transmit timing advance $N'_{TAoffset}$. For example, the terminal device may obtain the uplink transmit timing by using a formula $(N'_{TA}+N'_{TAoffset}) \times T_s$.

There is a relatively great frequency difference between NR and LTE. As can be seen, in the prior art, a frequency difference between the NR DL carrier and the LTE UL carrier is relatively great. In addition, FDD cells in an LTE system are asynchronous, but in an NR system, to use technologies such as advanced interference coordination and interference cancellation, cell synchronization is probably required. Therefore, frame timings of the NR DL carrier and the LTE UL carrier may be different. Therefore, in the prior art, the manner of determining, by the terminal device based on the downlink receive timing of the NR DL carrier, the uplink transmit timing corresponding to the LTE UL carrier is inaccurate.

However, in this application, the manner of determining, by the terminal device based on the downlink receive timing of the LTE DL carrier, the uplink transmit timing corresponding to the LTE UL carrier is more accurate.

In this application, a process of calculating the reference time synchronization information and/or the reference frequency synchronization information of the second downlink carrier is as follows:

The terminal device may measure, based on the second downlink configuration information, a downlink signal transmitted on the second downlink carrier. For example, the downlink signal may be a downlink synchronization signal or a downlink reference signal. Further, the terminal device may obtain the reference time synchronization information and/or the reference frequency synchronization information of the second downlink carrier through measurement. Then the terminal device obtains, based on the reference time synchronization information and/or the reference frequency synchronization information of the second downlink carrier, reference time synchronization information and/or reference frequency synchronization information of an uplink signal transmitted by the terminal device on the second uplink carrier.

In a scenario shown in FIG. 1, if a first downlink carrier is an NR DL carrier, and a second downlink carrier is an LTE DL carrier, and a second uplink carrier is an LTE UL carrier, a terminal device receives, on the NR DL carrier, a broadcast message transmitted by a network device, where the broadcast message includes LTE DL configuration information corresponding to the LTE DL carrier. The terminal device measures, based on the LTE DL configuration information, a downlink signal transmitted on the LTE DL carrier, to obtain reference time synchronization information and/or reference frequency synchronization information of the LTE DL carrier. Then the terminal device obtains, based on the reference time synchronization information and/or the reference frequency synchronization information of the LTE DL carrier, reference time synchronization information and/ or reference frequency synchronization information of an uplink signal transmitted by the terminal device on the LTE UL carrier.

In the prior art, if a first downlink carrier is an NR DL carrier, and a second uplink carrier is an LTE UL carrier, a terminal device receives, on the NR DL carrier, a broadcast message transmitted by a network device, where the broadcast message includes NR DL configuration information corresponding to the NR DL carrier. The terminal device measures, based on the NR DL configuration information, a downlink signal transmitted on the NR DL carrier, to obtain reference time synchronization information and/or reference frequency synchronization information of the NR DL carrier. Then the terminal device obtains, based on the reference time synchronization information and/or the reference frequency synchronization information of the NR DL carrier, reference time synchronization information and/or reference frequency synchronization information of an uplink signal transmitted by the terminal device on the LTE UL carrier.

There is a relatively great frequency difference between NR and LTE. As can be seen, in the prior art, because a frequency difference between the NR DL carrier and the LTE UL carrier is relatively great, the manner of obtaining, by the terminal device based on the reference time synchronization information and/or the reference frequency synchronization information of the NR DL carrier, the reference time synchronization information and/or the reference frequency synchronization information of the uplink signal transmitted by the terminal device on the LTE UL carrier is inaccurate.

In this application, the manner of obtaining, by the terminal device based on the reference time synchronization information and/or the reference frequency synchronization information of the LTE DL carrier, the reference time synchronization information and/or the reference frequency synchronization information of the uplink signal transmitted by the terminal device on the LTE UL carrier is more accurate.

S24. The terminal device transmits an uplink signal on the second uplink carrier to the network device based on the reference information of the second downlink carrier.

In this embodiment, after determining the reference information of the second downlink carrier, the terminal device may transmit the uplink signal on the second uplink carrier to the network device based on the reference information of the second downlink carrier. Specific content of the uplink signal is not limited in this application. For example, the uplink signal may be at least one of an uplink data channel, an uplink control channel, and an uplink reference signal.

Figure 9:
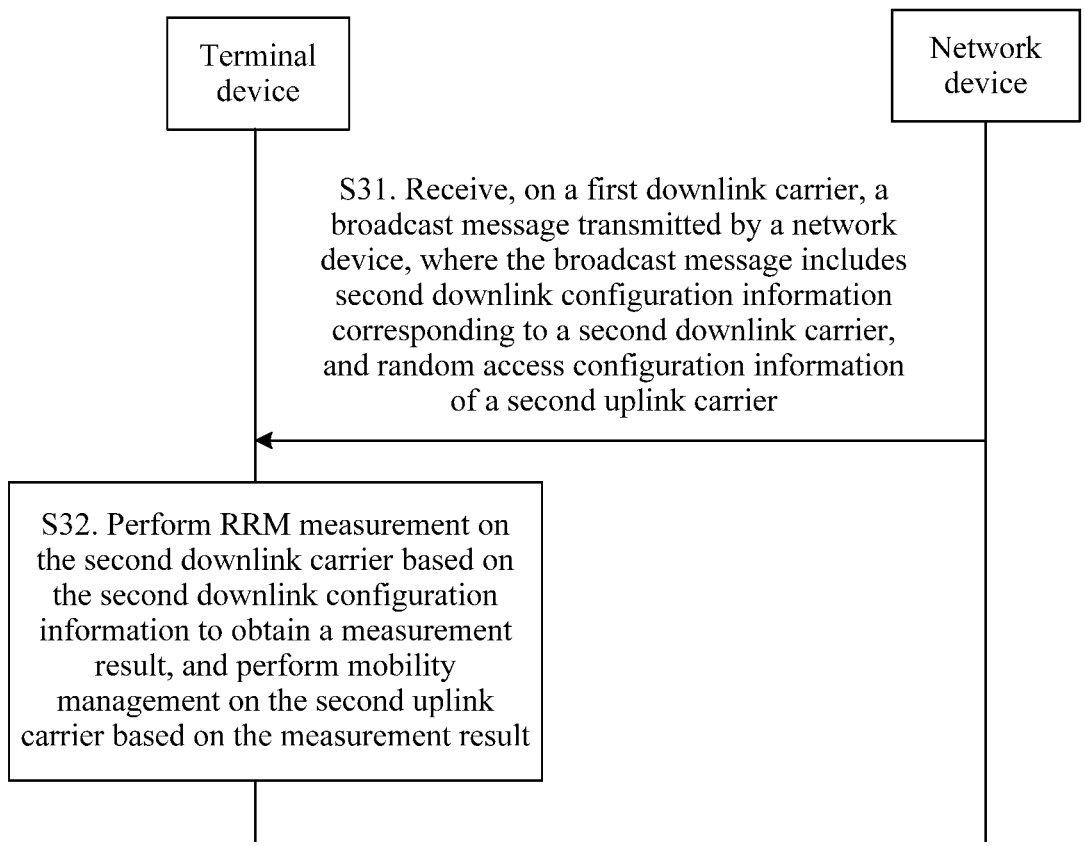
FIG. 9 is a signaling diagram 2 of another method for transmitting and receiving information according to one embodiment.

FIG. 9 is a signaling diagram 2 of another method for transmitting and receiving information according to one embodiment. FIG. 9 is used to perform a procedure of the other method provided in FIG. 5 for transmitting and receiving information. As shown in FIG. 9, the method includes the following steps.

S31. A terminal device receives, on a first downlink carrier, a broadcast message transmitted by a network device, where the broadcast message includes second downlink configuration information corresponding to a second downlink carrier, and random access configuration information of a second uplink carrier.

The second downlink configuration information includes second downlink frequency information and/or physical cell identifier information of the second downlink carrier, the first downlink carrier and the second uplink carrier are serving carriers of the terminal device, the second downlink carrier is not a serving carrier of the terminal device, and the second downlink carrier and the second uplink carrier are paired carriers on a system level.

In this embodiment, the network device transmits the broadcast message on the first downlink carrier, and the terminal device within a management scope of the network device receives the broadcast message on the first downlink carrier based on a requirement of the terminal device. For a process of this step, refer to step S11 in the signaling diagram of the method provided in FIG. 4 for transmitting and receiving information. The principle and process thereof are the same as those of step S11.

S32. The terminal device performs RRM measurement on the second downlink carrier based on the second downlink configuration information to obtain a measurement result; and the terminal device performs mobility management on the second uplink carrier based on the measurement result.

In this embodiment, because the second downlink carrier is not a serving carrier of the terminal device, but the second uplink carrier corresponding to the second downlink carrier on the system level is a serving carrier of the terminal device, to maintain mobility of the terminal device on the second uplink carrier in a low band, the terminal device needs to perform RRM measurement on the second downlink carrier. In one embodiment, RRM measurement may be reference signal received power (RSRP) measurement, reference signal received quality (RSRQ) measurement, or the like. Further, the terminal device can use a measurement result obtained through measurement to perform mobility management on the second uplink carrier used as a serving carrier of the current terminal device. In S205, after the terminal device detects the second downlink frequency information and/or physical cell identifier information of the second downlink carrier in the second downlink configuration information, the terminal device may perform downlink RRM measurement on the second downlink carrier based on the second downlink frequency information and/or physical cell identifier information, and may obtain a measurement result. Then the terminal device may use the measurement result to perform mobility management on the second uplink carrier. Mobility management includes at least one of the following: whether to replace the second uplink carrier, and whether to configure the second uplink carrier.

In a scenario shown in FIG. 1, if a first downlink carrier is an NR DL carrier, and a second downlink carrier is an LTE DL carrier, and a second uplink carrier is an LTE UL carrier, a terminal device receives, on the NR DL carrier, a broadcast message transmitted by a network device, where the broadcast message includes LTE DL configuration information corresponding to the LTE DL carrier; the terminal device performs RRM measurement on the LTE DL carrier based on the LTE DL configuration information; and the terminal device performs mobility management on the LTE UL carrier based on the measurement result.

In this embodiment, the terminal device receives, on the first downlink carrier, the broadcast message transmitted by the network device, where the broadcast message includes the second downlink configuration information corresponding to the second downlink carrier, the second downlink configuration information includes the second downlink frequency information and/or physical cell identifier information of the second downlink carrier, the first downlink carrier and the second uplink carrier are serving carriers of the terminal device, the second downlink carrier is not a serving carrier of the terminal device, and the second downlink carrier and the second uplink carrier are paired carriers on the system level; the terminal device determines reference information of the second downlink carrier based on the second downlink configuration information; and the terminal device transmits an uplink signal on the second uplink carrier to the network device based on the reference information of the second downlink carrier. Therefore, the terminal device obtains, from the first downlink carrier, the second downlink configuration information corresponding to the second downlink carrier and transmitted by the network device, where the first downlink carrier is a serving carrier of the terminal device, but the second downlink carrier is not a serving carrier of the terminal device. The terminal device may determine, based on the second downlink configuration information corresponding to the second downlink carrier, reference information for transmitting a signal on the second uplink carrier, where the second uplink carrier is a serving carrier of the terminal device. Further, the terminal device may obtain, from the first downlink carrier, configuration information that is not of a serving carrier of the current terminal device, so that the terminal device transmits an uplink signal based on the configuration information that is not of the serving carrier of the current terminal device. Configuration information corresponding to an NR high-frequency downlink carrier is not used to obtain downlink reference information for transmitting a signal on an LTE low-frequency uplink carrier; instead, LTE low-frequency downlink carrier configuration information carried on the NR high-frequency downlink carrier may be used to obtain reference information, and the signal is transmitted on the LTE low-frequency uplink carrier based on the reference information. This helps improve system performance in an NR-LTE coexistence scenario.

Figure 10:
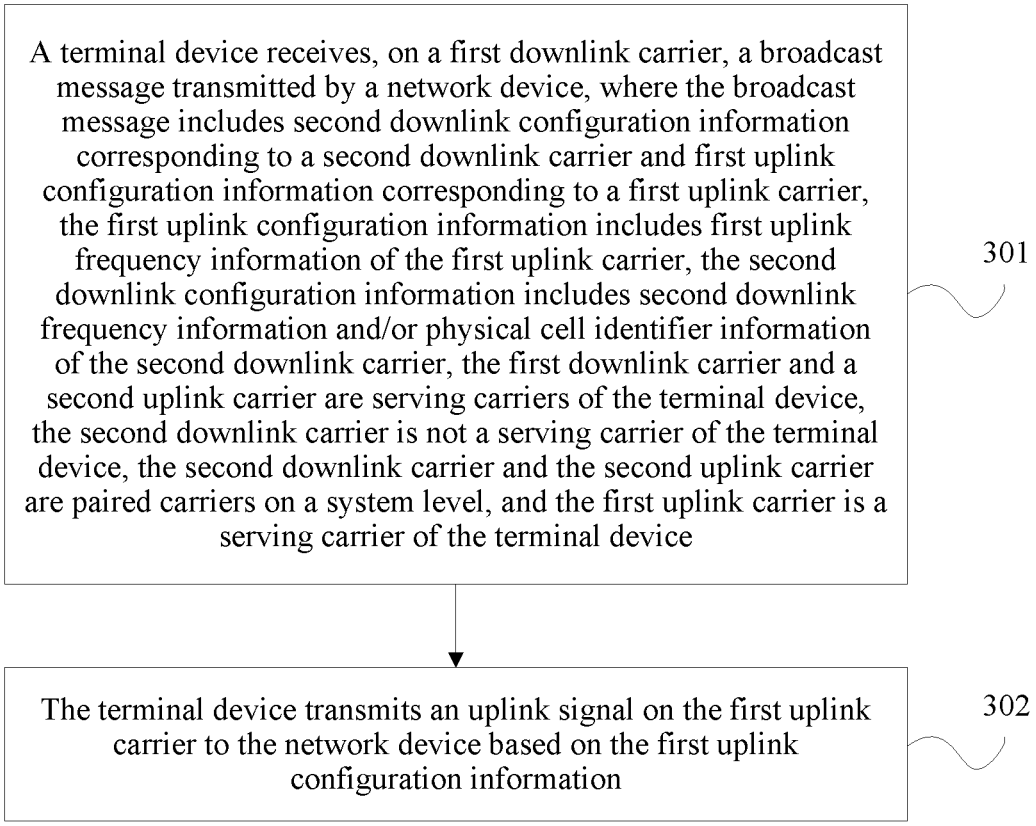
FIG. 10 is a schematic flowchart of still another method for transmitting and receiving information according to one embodiment.

FIG. 10 is a schematic flowchart of still another method for transmitting and receiving information according to one embodiment. As shown in FIG. 10, on a basis of the embodiment shown in FIG. 3, the method includes the following steps.

S301. A terminal device receives, on a first downlink carrier, a broadcast message transmitted by a network device, where the broadcast message includes second downlink configuration information corresponding to a second downlink carrier and first uplink configuration information corresponding to a first uplink carrier.

The first uplink configuration information includes first uplink frequency information of the first uplink carrier, the second downlink configuration information includes second downlink frequency information and/or physical cell identifier information of the second downlink carrier, the first downlink carrier and a second uplink carrier are serving carriers of the terminal device, the second downlink carrier is not a serving carrier of the terminal device, the second downlink carrier and the second uplink carrier are paired carriers on a system level, and the first uplink carrier is a serving carrier of the terminal device.

S302. The terminal device transmits an uplink signal on the first uplink carrier to the network device based on the first uplink configuration information.

Figure 11:
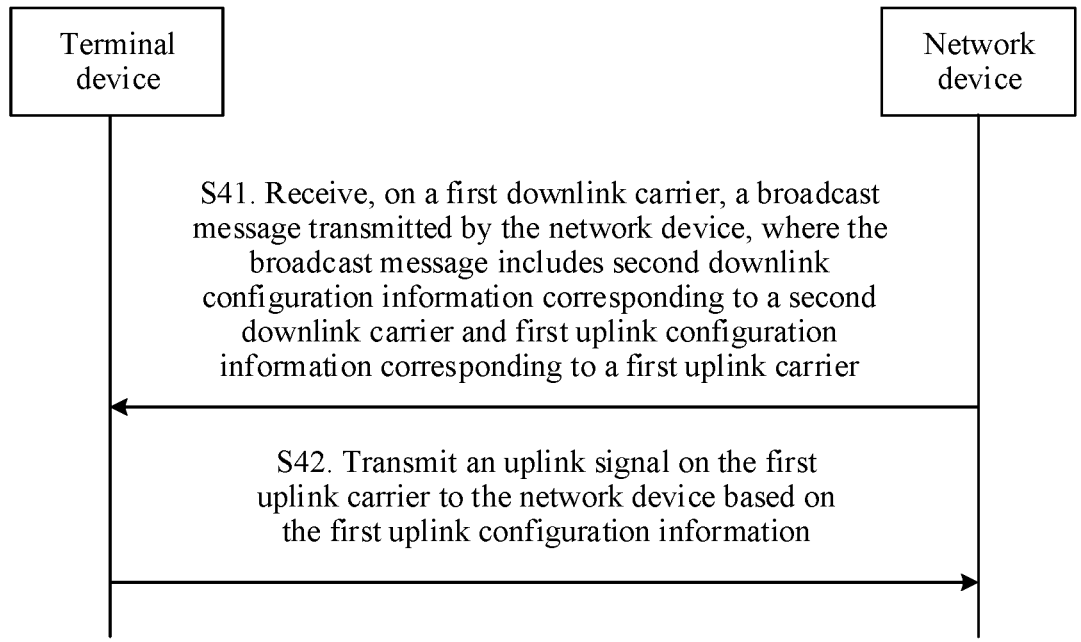
FIG. 11 is a signaling diagram of still another method for transmitting and receiving information according to one embodiment.

FIG. 11 is a signaling diagram of still another method for transmitting and receiving information according to an embodiment of this application. FIG. 11 is used to perform a procedure of the still another method provided in FIG. 10 for transmitting and receiving information. As shown in FIG. 11, the method includes the following steps.

S41. A terminal device receives, on a first downlink carrier, a broadcast message transmitted by a network device, where the broadcast message includes second downlink configuration information corresponding to a second downlink carrier and first uplink configuration information corresponding to a first uplink carrier.

The first uplink configuration information includes first uplink frequency information of the first uplink carrier, the second downlink configuration information includes second downlink frequency information and/or physical cell identifier information of the second downlink carrier, the first downlink carrier and a second uplink carrier are serving carriers of the terminal device, the second downlink carrier is not a serving carrier of the terminal device, the second downlink carrier and the second uplink carrier are paired carriers on a system level, and the first uplink carrier is a serving carrier of the terminal device.

In this embodiment, the network device transmits the broadcast message on the first downlink carrier, and the terminal device within a management scope of the network device receives the broadcast message on the first downlink carrier based on a requirement of the terminal device. For a process of this step, refer to step S11 in the signaling diagram of the method provided in FIG. 4 for transmitting and receiving information. The principle and process thereof are the same as those of step S11.

The following describes differences between step S41 in this embodiment and step S11 in FIG. 4.

Differences from FIG. 4 are as follows: In this embodiment, because the first uplink carrier paired with the first downlink carrier may also exist in a high band on an NR system level, the broadcast message transmitted by the network device on the first downlink carrier further carries the first uplink configuration information corresponding to the first uplink carrier, and the first uplink configuration information includes the first uplink frequency information of the first uplink carrier. In addition, the first uplink carrier and the first downlink carrier are both located on a first band.

For example, the first uplink carrier may be an NR-only UL carrier, or a UL carrier in NR TDD, or a UL carrier in NR FDD. The first uplink carrier may be deployed in the first band, and a band whose frequency is higher than or equal to 2.5 GHz may be selected. For example, a frequency of the first uplink carrier is 20 GHz to 30 GHz, or a frequency of the first uplink carrier is 3.5 GHz. In this embodiment, the first uplink carrier may be used as a serving carrier of the terminal device. In one embodiment, the terminal device may transmit an uplink signal on the first uplink carrier to the network device.

For example, the first downlink carrier and the first uplink carrier are a pair of NR FDD carriers, or the first downlink carrier and the first uplink carrier are a pair of NR TDD carriers.

In addition, a manner of accessing the network device by the terminal device may include the following four embodiments.

Figure 12:
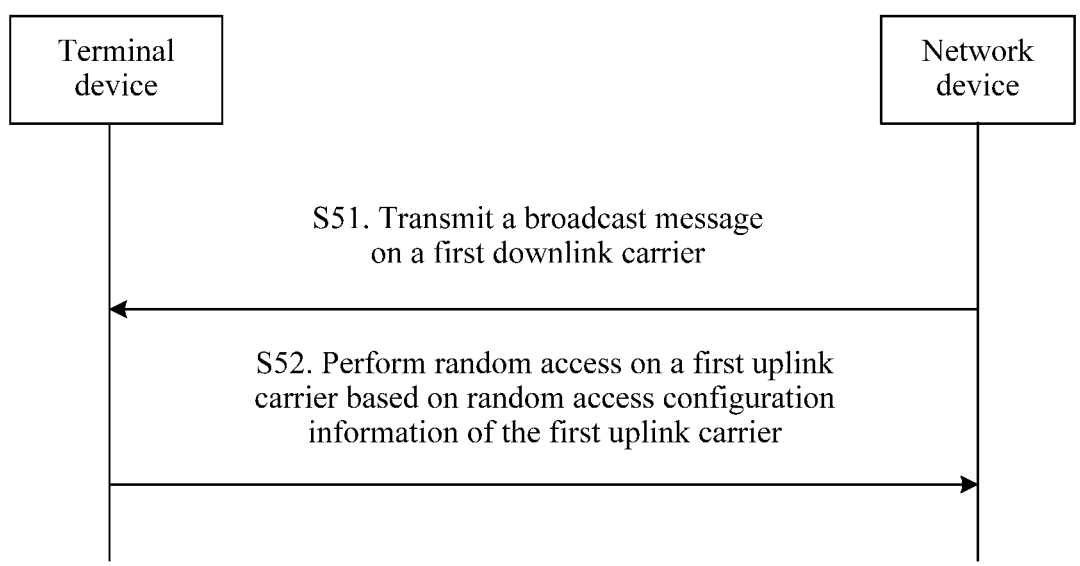
FIG. 12 is a signaling diagram 1 of random access of a terminal device in still another method for transmitting and receiving information according to one embodiment.

In one embodiment, FIG. 12 is a signaling diagram 1 of random access of a terminal device in still another method for transmitting and receiving information according to one embodiment. As shown in FIG. 12, the method includes the following steps.

S51. A network device transmits a broadcast message on a first downlink carrier.

The broadcast message includes second downlink configuration information corresponding to a second downlink carrier and first uplink configuration information corresponding to a first uplink carrier, and the first uplink configuration information includes first uplink frequency information of the first uplink carrier and random access configuration information of the first uplink carrier.

S52. A terminal device performs random access on the first uplink carrier based on the random access configuration information of the first uplink carrier.

Herein the network device transmits the broadcast message on the first downlink carrier, where the broadcast message includes the second downlink configuration information corresponding to the second downlink carrier and the first uplink configuration information corresponding to the first uplink carrier, and the first uplink configuration information includes the first uplink frequency information of the first uplink carrier and the random access configuration information of the first uplink carrier; further, the terminal device may receive the broadcast message on the first downlink carrier; and the terminal device performs random access on the first uplink carrier based on the random access configuration information of the first uplink carrier to access the network device.

Figure 13:
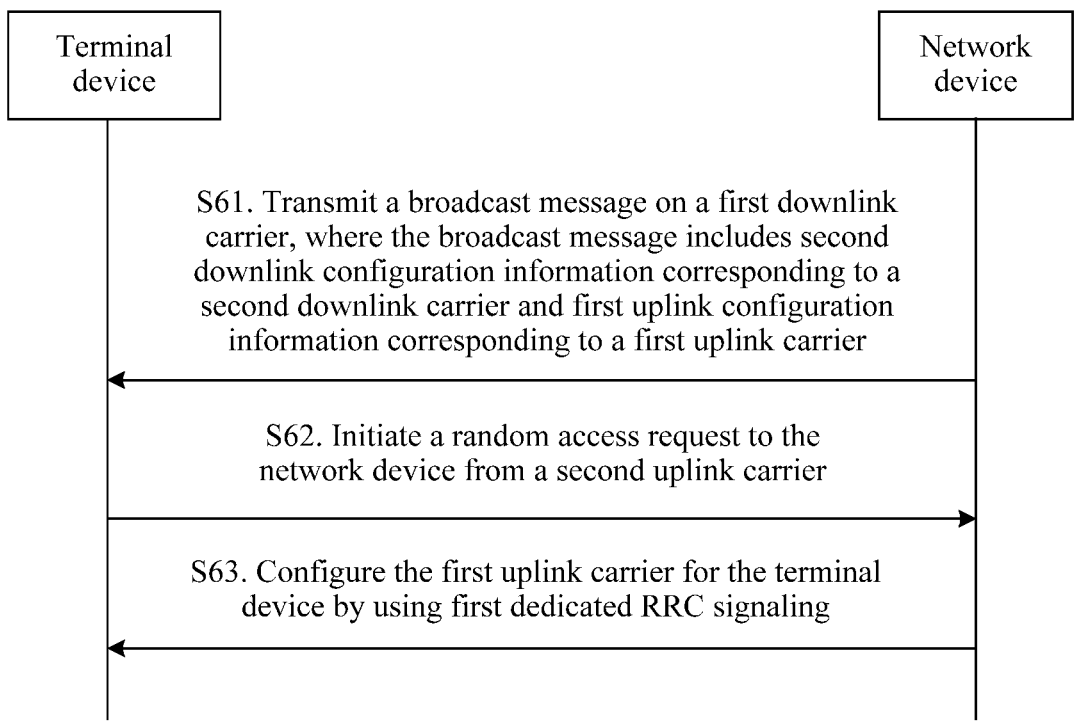
FIG. 13 is a signaling diagram 2 of random access of a terminal device in still another method for transmitting and receiving information according to one embodiment.

In a second embodiment, FIG. 13 is a signaling diagram 2 of random access of a terminal device in still another method for transmitting and receiving information according to an embodiment of this application. As shown in FIG. 13, the method includes the following steps.

S61. A network device transmits a broadcast message on a first downlink carrier.

The broadcast message includes second downlink configuration information corresponding to a second downlink carrier and first uplink configuration information corresponding to a first uplink carrier, the first uplink configuration information includes first uplink frequency information of the first uplink carrier, and the second downlink configuration information includes second downlink frequency information and/or physical cell identifier information of the second downlink carrier and random access configuration information of a second uplink carrier.

S62. A terminal device initiates a random access request to the network device from the second uplink carrier to access the network device.

S63. The network device configures the first uplink carrier for the terminal device by using first dedicated RRC signaling.

Herein the network device transmits the broadcast message on the first downlink carrier, where the broadcast message includes the second downlink configuration information corresponding to the second downlink carrier and the first uplink configuration information corresponding to the first uplink carrier, the first uplink configuration information includes the first uplink frequency information of the first uplink carrier, and the second downlink configuration information includes the second downlink frequency information and/or physical cell identifier information of the second downlink carrier and the random access configuration information of the second uplink carrier; further, the terminal device may receive the broadcast message on the first downlink carrier; the terminal device initiates the random access request to the network device from the second uplink carrier to access the network device; and the network device configures the first uplink carrier for the terminal device by using the first dedicated RRC signaling. Further, the network device configures both the first uplink carrier and the second uplink carrier for the terminal device, where both the first uplink carrier and the second uplink carrier may be used as serving carriers of the terminal device.

Figure 14:
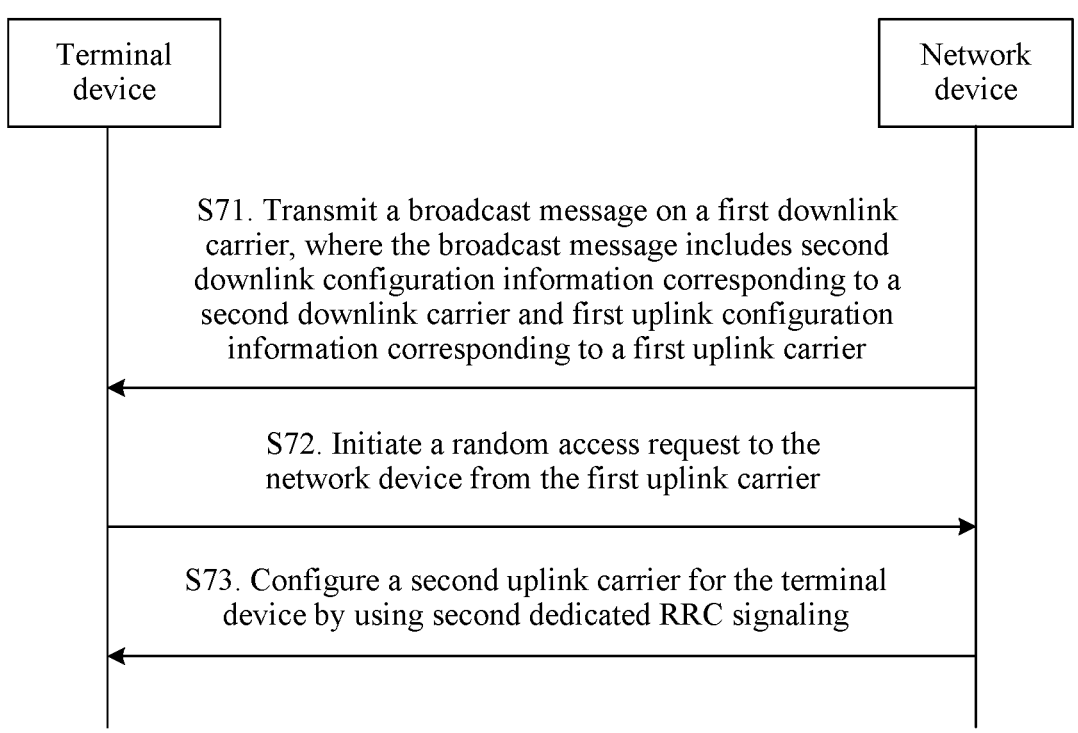
FIG. 14 is a signaling diagram 3 of random access of a terminal device in still another method for transmitting and receiving information according to one embodiment.

In a third embodiment, FIG. 14 is a signaling diagram 3 of random access of a terminal device in still another method for transmitting and receiving information according to an embodiment of this application. As shown in FIG. 14, the method includes the following steps.

S71. A network device transmits a broadcast message on a first downlink carrier.

The broadcast message includes second downlink configuration information corresponding to a second downlink carrier and first uplink configuration information corresponding to a first uplink carrier, the first uplink configuration information includes first uplink frequency information of the first uplink carrier and random access configuration information of the first uplink carrier, and the second downlink configuration information includes second downlink frequency information and/or physical cell identifier information of the second downlink carrier.

S72. A terminal device initiates a random access request to the network device on the first uplink carrier to access the network device.

S73. The network device configures a second uplink carrier for the terminal device by using second dedicated RRC signaling.

Herein the network device transmits the broadcast message on the first downlink carrier, where the broadcast message includes the second downlink configuration information corresponding to the second downlink carrier and the first uplink configuration information corresponding to the first uplink carrier, the first uplink configuration information includes the first uplink frequency information of the first uplink carrier and the random access configuration information of the first uplink carrier, and the second downlink configuration information includes the second downlink frequency information and/or physical cell identifier information of the second downlink carrier; further, the terminal device may receive the broadcast message on the first downlink carrier; the terminal device initiates the random access request to the network device on the first uplink carrier to access the network device; and the network device configures the second uplink carrier for the terminal device by using the second dedicated RRC signaling. Further, the network device may also configure both the first uplink carrier and the second uplink carrier for the terminal device, where both the first uplink carrier and the second uplink carrier may be used as serving carriers of the terminal device.

Figure 15:
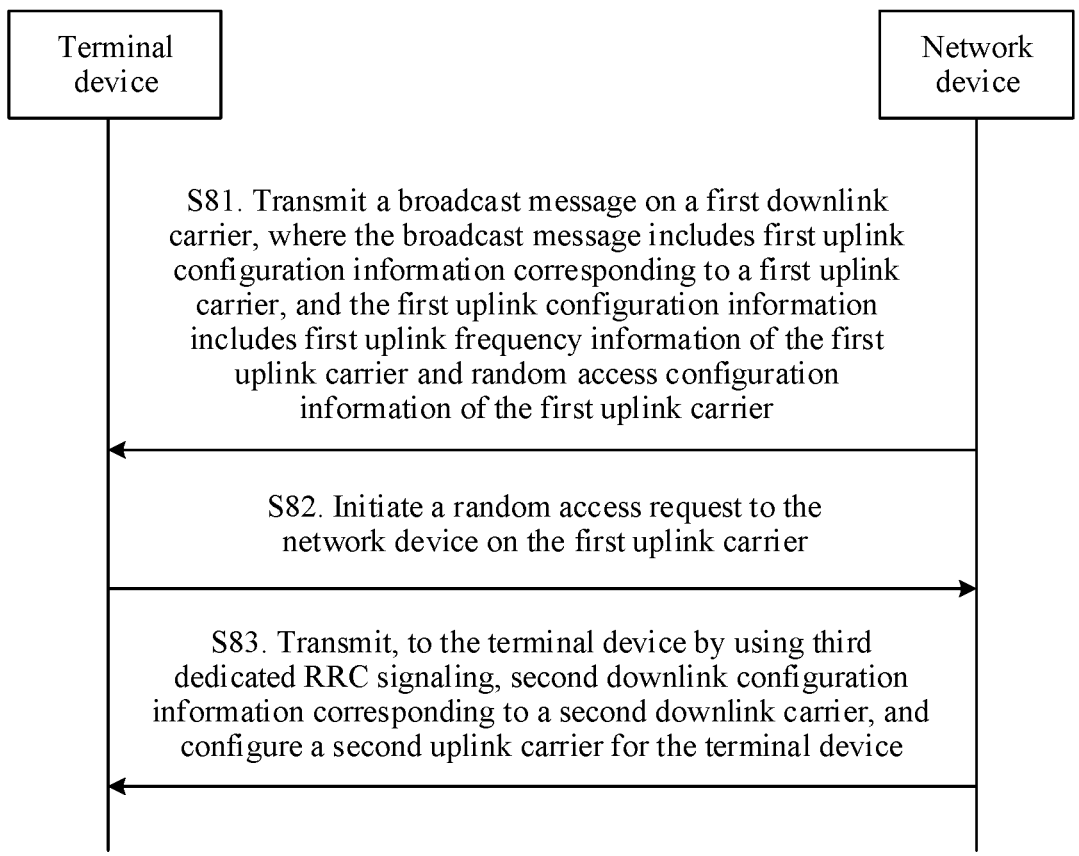
FIG. 15 is a signaling diagram 4 of random access of a terminal device in still another method for transmitting and receiving information according to one embodiment.

In a fourth embodiment, FIG. 15 is a signaling diagram 4 of random access of a terminal device in still another method for transmitting and receiving information according to an embodiment of this application. As shown in FIG. 15, the method includes the following steps.

S81. A network device transmits a broadcast message on a first downlink carrier, where the broadcast message includes first uplink configuration information corresponding to a first uplink carrier, and the first uplink configuration information includes first uplink frequency information of the first uplink carrier and random access configuration information of the first uplink carrier.

S82. A terminal device initiates a random access request to the network device on the first uplink carrier to access the network device.

S83. The network device transmits, to the terminal device by using third dedicated RRC signaling, second downlink configuration information corresponding to a second downlink carrier, and configures a second uplink carrier for the terminal device, where the second downlink configuration information includes second downlink frequency information and/or physical cell identifier information of the second downlink carrier.

Herein the network device transmits the broadcast message on the first downlink carrier, where the broadcast message includes the first uplink configuration information corresponding to the first uplink carrier, and the first uplink configuration information includes the first uplink frequency information of the first uplink carrier and the random access configuration information of the first uplink carrier; further, the terminal device may receive the broadcast message on the first downlink carrier; the terminal device initiates the random access request to the network device on the first uplink carrier to access the network device; and the network device configures the second uplink carrier for the terminal device by using the third dedicated RRC signaling. In addition, the network device transmits, to the terminal device by using the third RRC signaling, the second downlink configuration information corresponding to the second downlink carrier. In this case, the second downlink configuration information includes the second downlink frequency information and/or physical cell identifier information of the second downlink carrier. Further, the network device may also configure both the first uplink carrier and the second uplink carrier for the terminal device, where both the first uplink carrier and the second uplink carrier may be used as serving carriers of the terminal device.

S42. The terminal device transmits an uplink signal on the first uplink carrier to the network device based on the first uplink configuration information.

In this embodiment, a manner of transmitting the uplink signal by the terminal device to the network device on the first uplink carrier based on the first uplink configuration information in S31 includes the following three embodiments:

In a first embodiment, the terminal device transmits information on the first uplink carrier and the second uplink carrier simultaneously, where the transmitted information is different information.

In a second embodiment, the terminal device transmits information on the first uplink carrier and the second uplink carrier alternately. In this case, both the first uplink carrier and the second uplink carrier are serving carriers of the terminal device, but the terminal device is not allowed to transmit uplink signals on the first uplink carrier and the second uplink carrier simultaneously. The terminal device may transmit uplink signals on the first uplink carrier and the second uplink carrier alternately in time domain. This can save a baseband capability of the terminal device.

In a third embodiment, the terminal device transmits information on the first uplink carrier and the second uplink carrier alternately. In this case, the terminal device transmits an uplink reference signal on the first uplink carrier. For example, the uplink reference signal may be an NR SRS, which may further assist in an uplink beamforming operation on the first uplink carrier. The terminal device transmits an uplink data channel, an uplink control channel, an uplink reference signal, or the like on the second uplink carrier.

In this embodiment, the terminal device receives, on the first downlink carrier, the broadcast message transmitted by the network device, where the broadcast message includes the second downlink configuration information corresponding to the second downlink carrier and the first uplink configuration information corresponding to the first uplink carrier, the first uplink configuration information includes the first uplink frequency information of the first uplink carrier, the second downlink configuration information includes the second downlink frequency information and/or physical cell identifier information of the second downlink carrier, the first downlink carrier and the second uplink carrier are serving carriers of the terminal device, the second downlink carrier is not a serving carrier of the terminal device, the second downlink carrier and the second uplink carrier are paired carriers on the system level, and the first uplink carrier is a serving carrier of the terminal device; and the terminal device transmits the uplink signal on the first uplink carrier to the network device based on the first uplink configuration information. Therefore, on a basis of the foregoing embodiment, the first uplink carrier is configured for the terminal device, so that the first uplink carrier may also be used as a serving carrier of the terminal device. The terminal device transmits information on the first uplink carrier and the second uplink carrier simultaneously, or the terminal device transmits information on the first uplink carrier and the second uplink carrier alternately.

Figure 16:
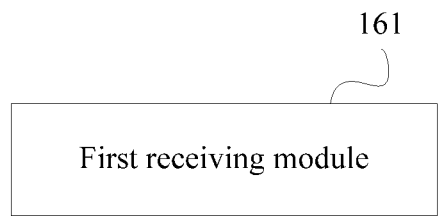
FIG. 16 is a schematic structural diagram of a terminal device according to one embodiment.

FIG. 16 is a schematic structural diagram of a terminal device according to one embodiment. As shown in FIG. 16, the terminal device includes:

a first receiving module 161 configured to receive, on a first downlink carrier, a broadcast message transmitted by a network device, where the broadcast message includes second downlink configuration information corresponding to a second downlink carrier, where the second downlink configuration information includes second downlink frequency information and/or physical cell identifier information of the second downlink carrier, the first downlink carrier and a second uplink carrier are serving carriers of the terminal device, the second downlink carrier is not a serving carrier of the terminal device, and the second downlink carrier and the second uplink carrier are paired carriers on a system level.

The first downlink carrier is located on a first band, the second uplink carrier and the second downlink carrier are located on a second band, and a frequency of the first band is higher than a frequency of the second band.

The broadcast message further includes second uplink configuration information corresponding to the second uplink carrier, and the second uplink configuration information includes second uplink frequency information of the second uplink carrier.

The first receiving module 161 may perform step S101 of the method shown in FIG. 3, that is, the first receiving module 161 may perform step S11 of the method shown in FIG. 4.

The terminal device in the embodiment shown in FIG. 16 may be configured to perform the technical solutions of the embodiments shown in FIG. 2 to FIG. 4. The implementation principles and technical effects thereof are similar, and are not described again herein.

Figure 17:
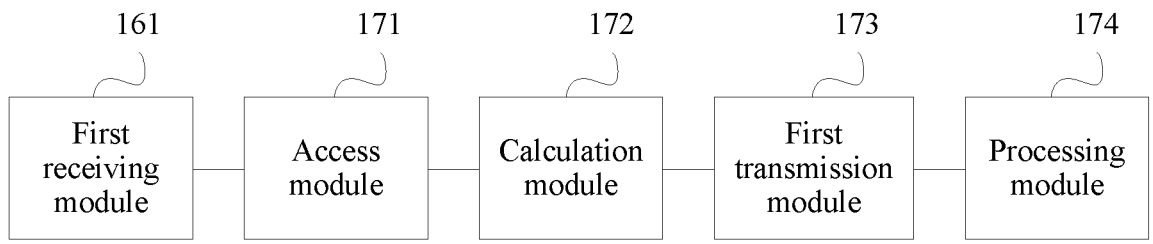
FIG. 17 is a schematic structural diagram of another terminal device according to one embodiment.

FIG. 17 is a schematic structural diagram of another terminal device according to one embodiment. On a basis of the terminal device shown in FIG. 16, as shown in FIG. 17, the terminal device includes:

a first receiving module 161 configured to receive, on a first downlink carrier, a broadcast message transmitted by a network device, where the broadcast message includes second downlink configuration information corresponding to a second downlink carrier, and random access configuration information of a second uplink carrier, where the second downlink configuration information includes second downlink frequency information and/or physical cell identifier information of the second downlink carrier, the first downlink carrier and the second uplink carrier are serving carriers of the terminal device, the second downlink carrier is not a serving carrier of the terminal device, and the second downlink carrier and the second uplink carrier are paired carriers on a system level; and the first receiving module 161 may perform step S201 of the method shown in FIG. 5, that is, the first receiving module 161 may perform step S21 of the method shown in FIG. 6.

In one embodiment, the broadcast message further includes the random access configuration information of the second uplink carrier; and the terminal device further includes:

an access module 171 configured to perform random access on the second uplink carrier based on the random access configuration information after the first receiving module 161 receives, on the first downlink carrier, the broadcast message transmitted by the network device, where the access module 171 may perform step S202 of the method shown in FIG. 5, that is, the first access module 171 may perform step S22 of the method shown in FIG. 6; and a calculation module 172 configured to determine reference information of the second downlink carrier based on the second downlink configuration information after the first receiving module 161 receives, on the first downlink carrier, the broadcast message transmitted by the network device, where the calculation module 172 may perform step S203 of the method shown in FIG. 5, and the calculation module 172 may perform step S23 of the method shown in FIG. 6.

In one embodiment, the reference information includes at least one of the following: a reference path loss, a reference downlink receive timing, reference time synchronization information, and reference frequency synchronization information.

In one embodiment, the terminal device further includes:

a first transmission module 173 configured to transmit an uplink signal on the second uplink carrier to the network device based on the reference information of the second downlink carrier after the calculation module 172 determines the reference information of the second downlink carrier, where the first transmission module 173 may perform step S204 of the method shown in FIG. 5, and the first transmission module 173 may perform step S24 of the method shown in FIG. 6.

In one embodiment, the terminal device further includes:

a processing module 174 configured to: after the first receiving module 161 receives, on the first downlink carrier, the broadcast message transmitted by the network device, perform RRM measurement on the second downlink carrier based on the second downlink configuration information to obtain a measurement result; and perform mobility management on the second uplink carrier based on the measurement result, where the processing module 174 may perform step S205 of the method shown in FIG. 5, and the processing module 174 may perform steps S31 and S32 of the method shown in FIG. 9.

The terminal device in the embodiment shown in FIG. 17 may be configured to perform the technical solutions of the embodiments shown in FIG. 5 to FIG. 9. The implementation principles and technical effects thereof are similar, and are not described again herein. In addition, the implementation of the embodiment shown in FIG. 17 does not depend on whether the embodiment shown in FIG. 16 is implemented, and the embodiment shown in FIG. 17 may be implemented separately.

Figure 18:
FIG. 18 is a schematic structural diagram of still another terminal device according to one embodiment.

FIG. 18 is a schematic structural diagram of still another terminal device according to one embodiment. On a basis of the terminal device shown in FIG. 16, as shown in FIG. 18, the terminal device includes:

a first receiving module 161 configured to receive, on a first downlink carrier, a broadcast message transmitted by a network device, where the broadcast message includes second downlink configuration information corresponding to a second downlink carrier and first uplink configuration information corresponding to a first uplink carrier, the first uplink configuration information includes first uplink frequency information of the first uplink carrier, the second downlink configuration information includes second downlink frequency information and/or physical cell identifier information of the second downlink carrier, the first downlink carrier and a second uplink carrier are serving carriers of the terminal device, the second downlink carrier is not a serving carrier of the terminal device, the second downlink carrier and the second uplink carrier are paired carriers on a system level, and the first uplink carrier is a serving carrier of the terminal device; and the first receiving module 161 may perform step S301 of the method shown in FIG. 10, and the first receiving module 161 may perform step S41 of the method shown in FIG. 11.

In one embodiment, the broadcast message further includes the first uplink configuration information corresponding to the first uplink carrier, and the first uplink configuration information includes the first uplink frequency information of the first uplink carrier; and the terminal device further includes:

a second transmission module 181 configured to transmit an uplink signal on the first uplink carrier to the network device based on the first uplink configuration information after the first receiving module 161 receives, on the first downlink carrier, the broadcast message transmitted by the network device, where the second transmission module 181 may perform step S302 of the method shown in FIG. 10, and the second transmission module 181 may perform step S42 of the method shown in FIG. 11.

The terminal device in the embodiment shown in FIG. 18 may be configured to perform the technical solutions of the embodiments shown in FIG. 10 to FIG. 15. The implementation principles and technical effects thereof are similar, and are not described again herein. In addition, the implementation of the embodiment shown in FIG. 18 does not depend on whether the embodiments shown in FIG. 16 and FIG. 17 are implemented, and the embodiment shown in FIG. 18 may be implemented separately.

Figure 19:
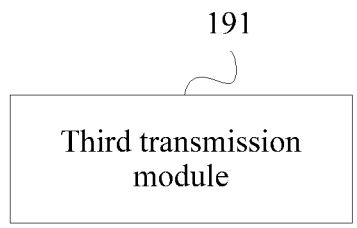
FIG. 19 is a schematic structural diagram of a network device according to one embodiment.

FIG. 19 is a schematic structural diagram of a network device according to one embodiment. As shown in FIG. 19, the network device includes:

a third transmission module 191 configured to transmit a broadcast message on a first downlink carrier, where the broadcast message includes second downlink configuration information corresponding to a second downlink carrier, where the second downlink configuration information includes second downlink frequency information and/or physical cell identifier information of the second downlink carrier, the first downlink carrier and a second uplink carrier are serving carriers of a terminal device, the second downlink carrier is not a serving carrier of the terminal device, and the second downlink carrier and the second uplink carrier are paired carriers on a system level.

The first downlink carrier is located on a first band, the second uplink carrier and the second downlink carrier are located on a second band, and a frequency of the first band is higher than a frequency of the second band.

The broadcast message further includes second uplink configuration information corresponding to the second uplink carrier, and the second uplink configuration information includes second uplink frequency information of the second uplink carrier.

The third transmission module 191 may perform step S11 of the method shown in FIG. 4.

The network device in the embodiment shown in FIG. 19 may be configured to perform the technical solutions of the embodiments shown in FIG. 2 to FIG. 4. The implementation principles and technical effects thereof are similar, and are not described again herein.

Figure 20:
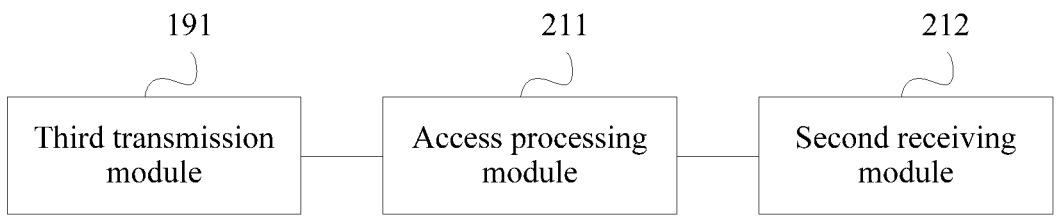
FIG. 20 is a schematic structural diagram of another network device according to one embodiment.

FIG. 20 is a schematic structural diagram of another network device according to one embodiment. As shown in FIG. 20, the network device includes:

a third transmission module 191 configured to transmit a broadcast message on a first downlink carrier, where the broadcast message includes second downlink configuration information corresponding to a second downlink carrier, and random access configuration information of a second uplink carrier, the second downlink configuration information includes second downlink frequency information and/or physical cell identifier information of the second downlink carrier, the first downlink carrier and the second uplink carrier are serving carriers of a terminal device, the second downlink carrier is not a serving carrier of the terminal device, and the second downlink carrier and the second uplink carrier are paired carriers on a system level; and the third transmission module 201 may perform step S21 of the method shown in FIG. 6.

In one embodiment, the broadcast message further includes the random access configuration information of the second uplink carrier; and the network device further includes:

an access processing module 211 configured to: after the third transmission module 191 transmits the broadcast message on the first downlink carrier, receive a random access request transmitted by the terminal device on the second uplink carrier based on the random access configuration information, for random access of the terminal device, where the access processing module 211 may perform step S22 of the method shown in FIG. 6.

In one embodiment, the network device further includes:

a second receiving module 212 configured to: after the third transmission module 191 transmits the broadcast message on the first downlink carrier, receive an uplink signal transmitted by the terminal device on the second uplink carrier based on reference information of the second downlink carrier, where the reference information of the second downlink carrier is determined by the terminal device based on the second downlink configuration information; and the second receiving module 212 may perform step S24 of the method shown in FIG. 6.

In one embodiment, the reference information includes at least one of the following:

a reference path loss, a reference downlink receive timing, reference time synchronization information, and reference frequency synchronization information.

The network device in the embodiment shown in FIG. 20 may be configured to perform the technical solutions of the embodiments shown in FIG. 5 to FIG. 9. The implementation principles and technical effects thereof are similar, and are not described again herein. In addition, the implementation of the embodiment shown in FIG. 20 does not depend on whether the embodiment shown in FIG. 19 is implemented, and the embodiment shown in FIG. 20 may be implemented separately.

Figure 21:
FIG. 21 is a schematic structural diagram of still another network device according to one embodiment.

FIG. 21 is a schematic structural diagram of still another network device according to one embodiment. As shown in FIG. 21, the network device includes:

a third transmission module 191 configured to transmit a broadcast message on a first downlink carrier, where the broadcast message includes second downlink configuration information corresponding to a second downlink carrier and first uplink configuration information corresponding to a first uplink carrier, the first uplink configuration information includes first uplink frequency information of the first uplink carrier, the second downlink configuration information includes second downlink frequency information and/or physical cell identifier information of the second downlink carrier, the first downlink carrier and a second uplink carrier are serving carriers of a terminal device, the second downlink carrier is not a serving carrier of the terminal device, the second downlink carrier and the second uplink carrier are paired carriers on a system level, and the first uplink carrier is a serving carrier of the terminal device; and the third transmission module 191 may perform step S41 of the method shown in FIG. 11.

In one embodiment, the network device further includes:

a third receiving module 221 configured to: after the third transmission module 191 transmits the broadcast message on the first downlink carrier, receive an uplink signal transmitted by the terminal device on the first uplink carrier based on the first uplink configuration information, where the third receiving module 221 may perform step S42 of the method shown in FIG. 11.

The network device in the embodiment shown in FIG. 21 may be configured to perform the technical solutions of the embodiments shown in FIG. 10 to FIG. 15. The implementation principles and technical effects thereof are similar, and are not described again herein. In addition, the implementation of the embodiment shown in FIG. 21 does not depend on whether the embodiments shown in FIG. 19 and FIG. 20 are implemented, and the embodiment shown in FIG. 21 may be implemented separately.

It should be understood that, division of modules of the terminal device and the network device is merely logical function division. In actual implementation, the modules may be all or partially integrated in one physical entity or may be separated physically. The modules may be all implemented in a form of software invoked by a processing element; or may be all implemented in a form of hardware; or some modules may be implemented in a form of software invoked by a processing element, and some modules are implemented in a form of hardware. For example, the transmission module may be a separately disposed processing element, or may be integrated in a chip of the terminal device or the network device for implementation. In addition, the transmission module may be stored in a memory of the terminal device or the network device in a form of a program, and invoked by a processing element of the terminal device to perform the function of each module. Implementation of another module is similar to this. In addition, the modules may be all or partially integrated, or may be implemented separately. The processing element may be an integrated circuit and has a signal processing capability. In an implementation process, steps in the foregoing methods or the foregoing modules can be implemented by using a hardware integrated logical circuit in the processing element, or by using instructions in a form of software. In addition, the receiving module is a module for controlling reception, and may receive, by using a receiving apparatus of the terminal device or the network device, for example, an antenna or a radio frequency apparatus, information transmitted by the network device. The transmission module is a module for controlling transmission, and may transmit information to the terminal device by using a transmission apparatus of the network device or the terminal device, for example, an antenna or a radio frequency apparatus.

For example, the modules may be configured as one or more integrated circuits for implementing the foregoing method, for example, one or more application specific integrated circuits (ASIC), one or more microprocessors (e.g., digital signal processor (DSP)), or one or more field programmable gate arrays (FPGA). For another example, when a module is implemented in a form of a program invoked by a processing element, the processing element may be a general-purpose processor, for example, a central processing unit (CPU) or another processor that can invoke the program. For another example, the units may be integrated, and implemented in a form of a system-on-a-chip (SOC).

Figure 22:
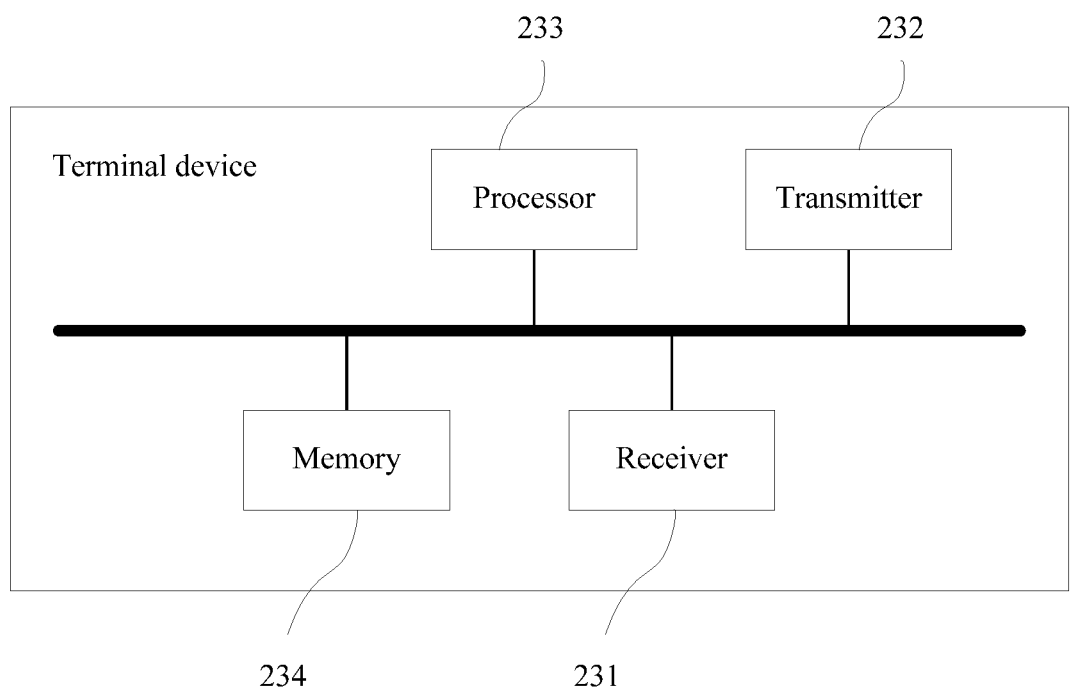
FIG. 22 is a schematic structural diagram of another terminal device according to one embodiment.

FIG. 22 is a schematic structural diagram of another terminal device according to one embodiment. As shown in FIG. 22, the terminal device includes a receiver 231, a transmitter 232, a processor 233, and a memory 234. The receiver 231 is configured to receive, on a first downlink carrier, a broadcast message transmitted by a network device, where the broadcast message includes second downlink configuration information corresponding to a second downlink carrier, the second downlink configuration information includes second downlink frequency information and/or physical cell identifier information of the second downlink carrier, the first downlink carrier and a second uplink carrier are serving carriers of the terminal device, the second downlink carrier is not a serving carrier of the terminal device, and the second downlink carrier and the second uplink carrier are paired carriers on a system level. In this case, the receiver 231 may implement the function of the first receiving module 161 in the terminal device shown in FIG. 16; further, the receiver 231 may perform step S101 of the method shown in FIG. 3, or the receiver 231 may perform step S11 of the method shown in FIG. 4; and corresponding steps in other method embodiments are implemented by the processor 233.

In one embodiment, the first downlink carrier is located on a first band, the second uplink carrier and the second downlink carrier are located on a second band, and a frequency of the first band is higher than a frequency of the second band.

In one embodiment, the broadcast message further includes second uplink configuration information corresponding to the second uplink carrier, and the second uplink configuration information includes second uplink frequency information of the second uplink carrier.

In one embodiment, the processor 233 is configured to determine reference information of the second downlink carrier based on the second downlink configuration information after the receiver 231 receives, on the first downlink carrier, the broadcast message transmitted by the network device. In this case, the processor 233 may implement the function of the calculation module 172 shown in FIG. 17. Further, the processor 233 performs step S203 of the method shown in FIG. 5, and the processor 233 may perform step S23 of the method shown in FIG. 6.

In one embodiment, the reference information includes at least one of the following: a reference path loss, a reference downlink receive timing, reference time synchronization information, and reference frequency synchronization information.

In one embodiment, the transmitter 232 is configured to transmit an uplink signal on the second uplink carrier to the network device based on the reference information of the second downlink carrier after the processor 233 determines the reference information of the second downlink carrier. In this case, the transmitter 232 may implement the function of the first transmission module 173 in the terminal device shown in FIG. 17. Further, the transmitter 232 may perform step S204 of the method shown in FIG. 5, or the transmitter 232 may perform step S24 of the method shown in FIG. 6.

In one embodiment, the processor 233 is further configured to: after the receiver 231 receives, on the first downlink carrier, the broadcast message transmitted by the network device, perform RRM measurement on the second downlink carrier based on the second downlink configuration information to obtain a measurement result; and perform mobility management on the second uplink carrier based on the measurement result. In this case, the processor 233 may implement the function of the processing module 174 in the terminal device shown in FIG. 17. Further, the processor 233 may perform step S205 of the method shown in FIG. 5, and the processor 233 may perform steps S31 to S32 of the method shown in FIG. 9.

In one embodiment, the broadcast message further includes random access configuration information of the second uplink carrier; and the processor 233 is further configured to perform random access on the second uplink carrier based on the random access configuration information after the receiver 231 receives, on the first downlink carrier, the broadcast message transmitted by the network device. In this case, the processor 233 may implement the function of the access module 171 in the terminal device shown in FIG. 17. Further, the processor 233 may perform step S202 of the method shown in FIG. 5, and the processor 233 may perform step S22 of the method shown in FIG. 6.

In one embodiment, the broadcast message further includes first uplink configuration information corresponding to a first uplink carrier, and the first uplink configuration information includes first uplink frequency information of the first uplink carrier.

In one embodiment, the transmitter 232 is further configured to transmit an uplink signal on the first uplink carrier to the network device based on the first uplink configuration information after the first receiver 231 receives, on the first downlink carrier, the broadcast message transmitted by the network device. In this case, the transmitter 232 may implement the function of the second transmission module 181 in the terminal device shown in FIG. 18. Further, the transmitter 232 may perform step S302 of the method shown in FIG. 10, or the transmitter 232 may perform step S42 of the method shown in FIG. 11.

In one embodiment, the first uplink carrier is a serving carrier of the terminal device.

The terminal device in the embodiment shown in FIG. 22 may be configured to perform the technical solutions of the foregoing method embodiments. The implementation principles and technical effects thereof are similar, and are not described again herein.

The receiver 231 and the transmitter 232 may be connected to an antenna. In a downlink direction, the receiver 231 receives, by using the antenna, information transmitted by the network device, and transmits the information to the processor 233 for processing. In an uplink direction, the processor 233 processes data of the terminal device, and transmits the data to the network device by using the transmitter 232.

The memory 234 is configured to store a program for implementing the foregoing method embodiment or each module in the embodiments shown in FIG. 16 to FIG. 18. The processor 233 invokes the program to perform the operation of the foregoing method embodiment, to implement each module shown in FIG. 16 to FIG. 18.

Alternatively, some or all of the foregoing modules may be embedded in a chip of the terminal device in a form of an integrated circuit for implementation. The modules may be implemented separately, or may be integrated. To be specific, the modules may be configured as one or more integrated circuits for implementing the foregoing method, for example, one or more ASICs, one or more microprocessors (e.g., DSP), or one or more FPGAs.

Figure 23:
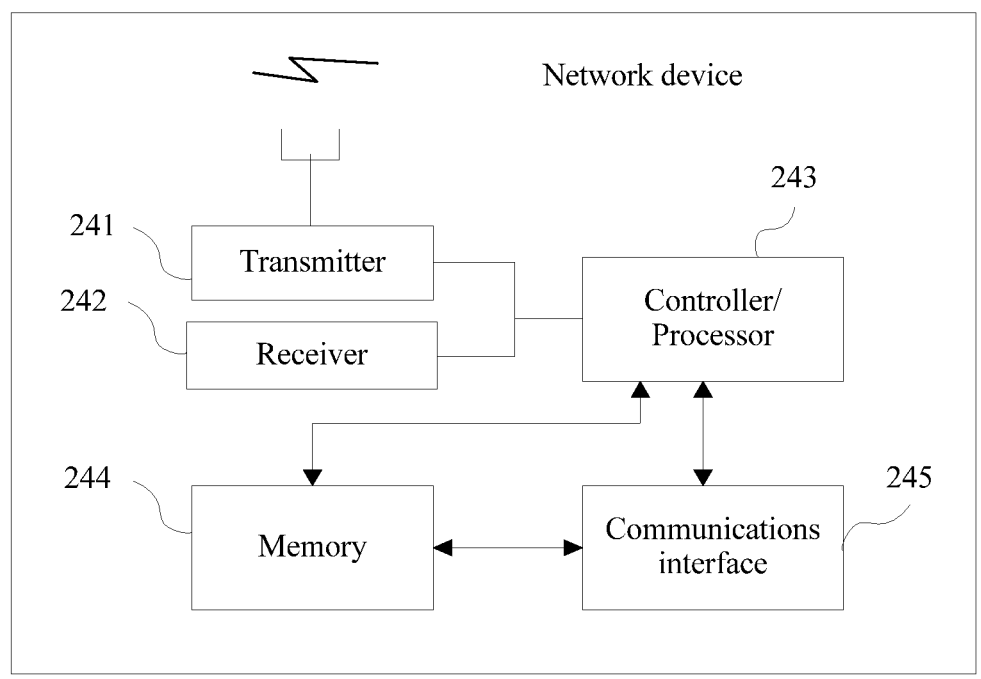
FIG. 23 is a schematic structural diagram of another network device according to one embodiment.

FIG. 23 is a schematic structural diagram of another network device according to one embodiment. As shown in FIG. 23, the network device includes a transmitter 241, a receiver 242, and a processor 243. The transmitter 241 is configured to transmit a broadcast message on a first downlink carrier, where the broadcast message includes second downlink configuration information corresponding to a second downlink carrier, the second downlink configuration information includes second downlink frequency information and/or physical cell identifier information of the second downlink carrier, the first downlink carrier and a second uplink carrier are serving carriers of a terminal device, the second downlink carrier is not a serving carrier of the terminal device, and the second downlink carrier and the second uplink carrier are paired carriers on a system level. In this case, the transmitter 241 may implement the function of the third transmission module 191 in the terminal device shown in FIG. 19, and further, the transmitter 241 may perform step S11 of the method shown in FIG. 4.

In one embodiment, the first downlink carrier is located on a first band, the second uplink carrier and the second downlink carrier are located on a second band, and a frequency of the first band is higher than a frequency of the second band.

In one embodiment, the receiver 242 is configured to: after the transmitter 241 transmits the broadcast message on the first downlink carrier, receive an uplink signal transmitted by the terminal device on the second uplink carrier based on reference information of the second downlink carrier, where the reference information of the second downlink carrier is determined by the terminal device based on the second downlink configuration information. In this case, the receiver 242 may implement the function of the second receiving module 212 in the terminal device shown in FIG. 20, and further, the receiver 242 may perform step S24 of the method shown in FIG. 6.

In one embodiment, the reference information includes at least one of the following: a reference path loss, a reference downlink receive timing, reference time synchronization information, and reference frequency synchronization information.

In one embodiment, the broadcast message further includes random access configuration information of the second uplink carrier; and the receiver 242 is further configured to: after the transmitter 241 transmits the broadcast message on the first downlink carrier, receive a random access request transmitted by the terminal device on the second uplink carrier based on the random access configuration information, for random access of the terminal device. In this case, the receiver 242 may implement the function of the access processing module 211 in the terminal device shown in FIG. 20, and further, the receiver 242 may perform step S22 of the method shown in FIG. 6; and other processes are implemented by the processor 243.

In one embodiment, the broadcast message further includes second uplink configuration information corresponding to the second uplink carrier, and the second uplink configuration information includes second uplink frequency information of the second uplink carrier.

In one embodiment, the broadcast message further includes first uplink configuration information corresponding to a first uplink carrier, and the first uplink configuration information includes first uplink frequency information of the first uplink carrier.

In one embodiment, the receiver 242 is further configured to: after the transmitter 241 transmits the broadcast message on the first downlink carrier, receive an uplink signal transmitted by the terminal device on the first uplink carrier based on the first uplink configuration information. In this case, the receiver 242 may implement the function of the second receiving module 212 in the terminal device shown in FIG. 20, and further, the receiver 242 may perform step S24 of the method shown in FIG. 6.

In one embodiment, the first uplink carrier is a serving carrier of the terminal device.

The network device in the embodiment shown in FIG. 23 may be configured to perform the technical solution in the foregoing method embodiment, or execute a program of each module in the embodiments shown in FIG. 19 to FIG. 21. The processor 243 invokes the program to perform the operation of the foregoing method embodiment, to implement each module shown in FIG. 19 to FIG. 21.

Alternatively, the processor 243 may be a controller, and is denoted as "Controller/Processor 243" in FIG. 23. The transmitter 241 and the receiver 242 are configured to support the network device in transmitting information to and receiving information from the terminal device in the foregoing embodiment, and support wireless communication between the terminal device and another terminal device. The processor 243 performs various functions used to communicate with the terminal device.

Further, the network device may further include a memory 244. The memory 244 is configured to store program code and data of the network device. In addition, the network device may further include a communications interface 245. The communications interface 245 is configured to support the network device in communicating with another network entity.

The processor 243, for example, a CPU, may be further configured as one or more integrated circuits for implementing the foregoing method, for example, one or more ASICs, one or more microprocessors (e.g., DSP), or one or more FPGAs. The memory 244 may be one memory, or may be a collective term for a plurality of storage elements.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line (DSL) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state drive (SSD)), or the like.

A person skilled in the art should be aware that in the foregoing one or more examples, functions described in the embodiments of this application may be implemented by hardware, software, firmware, or any combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another place. The storage medium may be any usable medium accessible to a general-purpose or dedicated computer.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for transmitting and receiving information, comprising:
   receiving, by a terminal device on a first downlink carrier, a broadcast message transmitted by a network device, wherein the broadcast message comprises second downlink configuration information corresponding to a second downlink carrier; and after receiving the broadcast message transmitted by the network device, determining, by the terminal device, reference information of the second downlink carrier based on the second downlink configuration information;

wherein the second downlink configuration information comprises second downlink frequency information or physical cell identifier information of the second downlink carrier, the first downlink carrier and a second uplink carrier are serving carriers of the terminal device, the second downlink carrier is not a serving carrier of the terminal device, and the second downlink carrier and the second uplink carrier are paired carriers on a system level;

wherein the first downlink carrier is located on a first band, the second uplink carrier and the second downlink carrier are located on a second band, and a frequency of the first band is higher than a frequency of the second band;

wherein the reference information comprises a reference path loss and a reference downlink receive timing;

wherein after determining the reference information of the second downlink carrier, the method further comprises: transmitting, by the terminal device, an uplink signal on the second uplink carrier to the network device based on the reference information of the second downlink carrier.

2. The method according to claim 1, further comprising: after receiving the broadcast message transmitted by the network device,
performing, by the terminal device, radio resource management (RRM) measurement on the second downlink carrier based on the second downlink configuration information to obtain a measurement result; and
performing, by the terminal device, mobility management on the second uplink carrier based on the measurement result.

3. The method according to claim 1, wherein the broadcast message further comprises random access configuration information of the second uplink carrier; and
further comprising: after receiving the broadcast message transmitted by the network device,
performing, by the terminal device, random access on the second uplink carrier based on the random access configuration information.

4. The method according to claim 1, wherein the broadcast message further comprises second uplink configuration information corresponding to the second uplink carrier, wherein the second uplink configuration information comprises second uplink frequency information of the second uplink carrier.

5. The method according to claim 1, wherein the broadcast message further comprises first uplink configuration information corresponding to a first uplink carrier, wherein the first uplink configuration information comprises first uplink frequency information of the first uplink carrier.

6. The method according to claim 5, further comprising: after receiving the broadcast message transmitted by the network device,
transmitting, by the terminal device, an uplink signal on the first uplink carrier to the network device based on the first uplink configuration information.

7. The method according to claim 6, wherein the first uplink carrier is a serving carrier of the terminal device.

8. A terminal device, comprising:
one or more processors;
a memory coupled to the one or more processors to store a program, which when executed by the one or more processors, causes the one or more processors to:
receive, on a first downlink carrier, a broadcast message transmitted by a network device, wherein the broadcast message comprises second downlink configuration information corresponding to a second downlink carrier; and
determine reference information of the second downlink carrier based on the second downlink configuration information after receiving the broadcast message transmitted by the network device;
wherein the second downlink configuration information comprises second downlink frequency information or physical cell identifier information of the second downlink carrier, the first downlink carrier and a second uplink carrier are serving carriers of the terminal device, the second downlink carrier is not a serving carrier of the terminal device, and the second downlink carrier and the second uplink carrier are paired carriers on a system level;
wherein the first downlink carrier is located on a first band, the second uplink carrier and the second downlink carrier are located on a second band, and a frequency of the first band is higher than a frequency of the second band;
wherein the reference information comprises a reference path loss and a reference downlink receive timing;
wherein the program, which when executed by the one or more processors, further causes the one or more processors to: transmit an uplink signal on the second uplink carrier to the network device based on the reference information of the second downlink carrier after determining the reference information of the second downlink carrier.

9. The terminal device according to claim 8, further wherein the program, which when executed by the one or more processors, further causes the one or more processors to:
receiving the broadcast message transmitted by the network device, perform radio resource management (RRM) measurement on the second downlink carrier based on the second downlink configuration information to obtain a measurement result; and perform mobility management on the second uplink carrier based on the measurement result.

10. The terminal device according to claim 8, wherein the broadcast message further comprises random access configuration information of the second uplink carrier; and
wherein the program, which when executed by the one or more processors, further causes the one or more processors to:
perform random access on the second uplink carrier based on the random access configuration information after receiving the broadcast message transmitted by the network device.

11. The terminal device according to claim 8, wherein the broadcast message further comprises second uplink configuration information corresponding to the second uplink carrier, wherein the second uplink configuration information comprises second uplink frequency information of the second uplink carrier.

12. The terminal device according to claim 8, wherein the broadcast message further comprises first uplink configuration information corresponding to a first uplink carrier, wherein the first uplink configuration information comprises first uplink frequency information of the first uplink carrier.

\* \* \* \* \*